(12) United States Patent
Tatsuno

(10) Patent No.: US 9,229,206 B2
(45) Date of Patent: Jan. 5, 2016

(54) PROJECTION OPTICAL SYSTEM AND IMAGE PROJECTION APPARATUS

(71) Applicant: Hibiki Tatsuno, Kanagawa (JP)

(72) Inventor: Hibiki Tatsuno, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 211 days.

(21) Appl. No.: 14/089,126

(22) Filed: Nov. 25, 2013

(65) Prior Publication Data

US 2014/0146295 A1 May 29, 2014

(30) Foreign Application Priority Data

Nov. 26, 2012 (JP) .................................. 2012-258052

(51) Int. Cl.
*G02B 17/08* (2006.01)
*G02B 21/28* (2006.01)
*G02B 13/16* (2006.01)

(52) U.S. Cl.
CPC ................ *G02B 17/08* (2013.01); *G02B 13/16* (2013.01); *G02B 21/28* (2013.01)

(58) Field of Classification Search
CPC ......... G02B 17/08; G02B 13/16; G03B 21/28
See application file for complete search history.

(56) References Cited

U.S. PATENT DOCUMENTS

| 7,589,307 | B2 | 9/2009 | Tatsuno |
|---|---|---|---|
| 7,922,340 | B2 | 4/2011 | Ohzawa |
| 8,217,374 | B2 | 7/2012 | Nishikawa et al. |
| 8,254,039 | B2 | 8/2012 | Fujita et al. |
| 2006/0056051 | A1 | 3/2006 | Hakko et al. |
| 2009/0257117 | A1 | 10/2009 | Baba |
| 2012/0154768 | A1 | 6/2012 | Tatsuno |
| 2012/0162753 | A1 | 6/2012 | Tatsuno |
| 2013/0070217 | A1 | 3/2013 | Tatsuno |
| 2013/0107166 | A1 | 5/2013 | Osaka et al. |
| 2013/0107232 | A1 | 5/2013 | Tatsuno |
| 2013/0107233 | A1 | 5/2013 | Hirakawa et al. |
| 2013/0107234 | A1 | 5/2013 | Nishina et al. |
| 2013/0114053 | A1 | 5/2013 | Tatsuno et al. |

(Continued)

FOREIGN PATENT DOCUMENTS

| JP | 2007-079524 | 3/2007 |
|---|---|---|
| JP | 4329863 | 6/2009 |

(Continued)

OTHER PUBLICATIONS

U.S. Appl. No. 13/665,427, filed Oct. 31, 2012.

(Continued)

*Primary Examiner* — David N Spector
(74) *Attorney, Agent, or Firm* — Oblon, McClelland, Maier & Neustadt, L.L.P.

(57) ABSTRACT

Disclosed is a projection optical system, including a first lens group configured to include at least one lens and have a positive refractive power, a second lens group configured to include at least one lens and have a positive refractive power, a third lens group configured to include at least one lens and have a negative refractive power, a fourth lens group configured to include at least one lens configured to have an aspheric surface or a free-form surface, and a concave mirror, wherein the first lens group, the second lens group, the third lens group, the fourth lens group, and the concave mirror are arranged in order and the projection optical system is a non-telecentric optical system.

9 Claims, 11 Drawing Sheets

(56) References Cited

U.S. PATENT DOCUMENTS

2015/0029474 A1* 1/2015 Tatsuno ............... G02B 17/08 353/97
2015/0138625 A1* 5/2015 Tatsuno ............... G02B 17/08 359/292

FOREIGN PATENT DOCUMENTS

| JP | 2009-251457 | 10/2009 |
|---|---|---|
| JP | 2010-085973 | 4/2010 |

OTHER PUBLICATIONS

U.S. Appl. No. 13/669,079, filed Nov. 5, 2012.
Office Action issued Aug. 5, 2015, in Chinese Patent Application No. 201310757362.0 (with English translation).

* cited by examiner

PROJECTION OPTICAL SYSTEM AND IMAGE PROJECTION APPARATUS

BACKGROUND OF THE INVENTION

1. Field of the Invention

An aspect of the present invention relates to at least one of a projection optical system and an image projection apparatus.

2. Description of the Related Art

An image projection apparatus has been known that is capable of being placed nearer a screen than conventional ones. Such an image projection apparatus is called a close-in projector. A close-in projector is such that it is possible to avoid glare of projection light incident on an eye of a presenter (such as a reporter or a speaker) standing near a screen that is a surface subjected to projection on which an image is projected. Furthermore, it is possible for a close-in projector to project an enlarged image without placing the projector near an audience listening to the presentation of a presenter, and hence, it is possible to be used in such a manner that exhaust or noise from such an image projection apparatus does not influence the audience.

A projection optical system included in a close-in projector is such that an angle of view of a conventional (coaxial or rotationally symmetric) projection optical system is increased to reduce its distance from a screen, a curved mirror is used to be capable of projecting an enlarged image even at a close range, or the like. In a case where an angle of view of a conventional projection optical system is increased, an outer diameter of a lens at a side near a screen may have to be increased, and hence, a total size of such a projector may be increased. On the other hand, as long as a curved mirror is used, it may be possible to have a compact projector and conduct projection in a close range.

For example, projection optical systems described in Japanese Patent No. 4329863, Japanese Patent Application Publication No. 2007-079524, Japanese Patent Application Publication No. 2009-251457, and Japanese Patent Application Publication No. 2010-085973 have been known that use a curved mirror. A projection optical system with a refractive optical system combined with a concave mirror is described in any of Japanese Patent No. 4329863, Japanese Patent Application Publication No. 2007-079524, Japanese Patent Application Publication No. 2009-251457, and Japanese Patent Application Publication No. 2010-085973.

Projection optical systems in Japanese Patent Application Publication No. 2009-251457 and Japanese Patent Application Publication No. 2010-085973 are projection optical systems that are telecentric with respect to an image display element. Projection optical systems in Japanese Patent Application Publication No. 2009-251457 and Japanese Patent Application Publication No. 2010-085973 are such that an aperture stop is arranged near a center of a refractive optical system in a direction of an optical axis thereof. In such a telecentric optical system, all of principal rays that are directed from an image display element to a projection optical system are perpendicular to the image display element. Therefore, among lenses that compose a telecentric projection optical system, a diameter (lens diameter) of a lens near an image display element tends to increase. However, a telecentric projection optical system may be such that light beams are entirely condensed at a position away from an image display element, and hence, it is possible to decrease a lens diameter of a lens arranged near a concave mirror.

On the other hand, projection optical systems in Japanese Patent No. 4329863 and Japanese Patent Application Publication No. 2007-079524 are projection optical systems that are non-telecentric with respect to an image display element. Projection optical systems in Japanese Patent No. 4329863 and Japanese Patent Application Publication No. 2007-079524 are such that an aperture stop is arranged at a position nearer a side of an image display element than around a center of a refractive optical system in a direction of an optical axis thereof. Such a non-telecentric projection optical system may be such that light beams that are directed from an image display element to the projection optical system are entirely condensed at a position near the image display element. Therefore, light beams that entirely leave from an image display element spread naturally, and hence, a diameter of a lens at a position near a concave mirror may be increased. Thus, in a non-telecentric projection optical system, there may be a larger difference between a lens diameter of a lens arranged at a position closest to an image display element and a lens diameter of a lens arranged at a position closest to a concave mirror.

A value of a "projection distance" to a screen that is a surface subjected to projection divided by a "transverse width" of an image projected on the screen is referred to as a "throw ratio". A projection optical system in Japanese Patent No. 4329863 is such that a throw ratio thereof may be smaller as being "0.5", and a difference between a "necessary degree of convergence of a light beam" for a light beam directed to a top end of a projected image and a "necessary degree of convergence of a light beam" for a light beam directed to a bottom end of the projected image may be smaller. Therefore, it may be possible to correct a distortion aberration or a curvature of field comparatively simply. However, in a case of a projection optical system with a throw ratio less than "0.35", it may be necessary for a refractive optical system and a concave mirror to separate a light beam directed to a top end of a projected image from a light beam directed to a bottom end of the projected image certainly and conduct a different control (of a degree of conversion or a direction of a light ray). Accordingly, a lens diameter of a lens close to a concave mirror and a size of a concave mirror may further be increased.

SUMMARY OF THE INVENTION

According to one aspect of the present invention, there is provided a projection optical system, including a first lens group configured to include at least one lens and have a positive refractive power, a second lens group configured to include at least one lens and have a positive refractive power, a third lens group configured to include at least one lens and have a negative refractive power, a fourth lens group configured to include at least one lens configured to have an aspheric surface or a free-form surface, and a concave mirror, wherein the first lens group, the second lens group, the third lens group, the fourth lens group, and the concave mirror are arranged in order and the projection optical system is a non-telecentric optical system.

According to another aspect of the present invention, there is provided an image projection apparatus, including an image display element configured to display an image, and the projection optical system as described above.

DETAILED DESCRIPTION OF THE PREFERRED EMBODIMENTS

Figure 1:
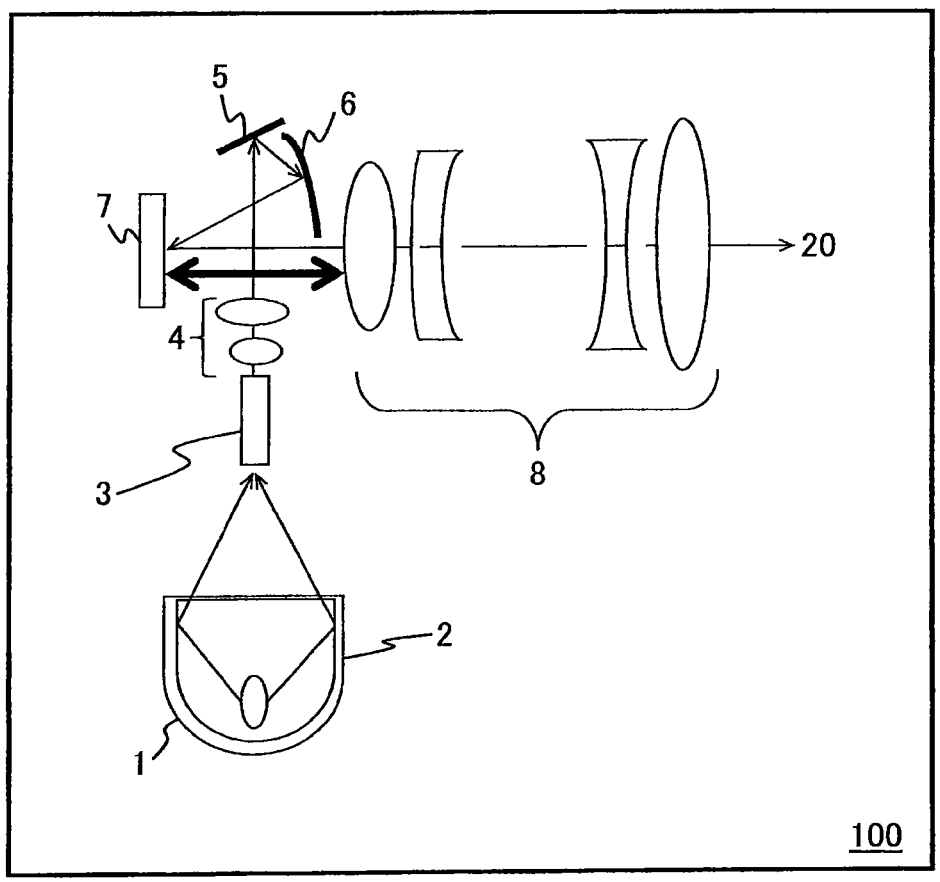
FIG. 1 is a side view of an essential part of an image projection apparatus capable of applying a projection optical system according to an embodiment of the present invention thereto, as viewed from one direction.

A projection optical system according to an embodiment of the present invention will be described below. First, an example of an image projection apparatus capable of applying a projection optical system according to an embodiment of the present invention thereto will be described. FIG. 1 is a side view of an essential part of a projector 100 that is an image projection apparatus as viewed from one direction. The projector 100 uses a reflection-type image display element for an image display element. Here, an image display element capable of being applied to a projection optical system according to an embodiment of the present invention is not limited to a reflection-type image display element but may be, for example, a liquid crystal panel.

The projector 100 in FIG. 1 is configured to illuminate a DMD 7 that is a reflection-type image display element, with light emitted from a lamp 1 that is a light source, through an illumination optical system. Light having illuminated the DMD 7 is reflected from a micro-mirror included in the DMD 7. Such reflected light is enlarged and projected onto a screen 20 that is a surface subjected to projection, by a projection optical system 8. Such a projection optical system 8 corresponds to a projection optical system according to an embodiment of the present invention.

The projection optical system 8 in FIG. 1 is configured to have a refraction optical system that includes a lens group(s) composed of a plurality of lenses and a mirror optical system that includes a (not-illustrated) mirror for reflecting, to the screen 20, light that is reflected from the DMD 7 and passes through the refraction optical system. Here, illustration of a lens or mirror tube for holding a lens group is omitted in FIG. 1.

The illumination optical system included in the projector 100 is composed of a lamp 1 to a curved mirror 6. Light emitted from the lamp 1 is condensed at an entrance of an integrator rod 3 by a reflector 2. The integrator rod 3 is a light pipe that is provided by combining four mirrors to be tunnel-like. Reflection of light incident on the integrator rod 3 from a mirror surface in the integrator rod 3 is repeated so that light with a uniform amount of light and no irregularity is provided at an exit of the integrator rod 3.

Light having passed through the integrator rod 3 passes through a lens for DMD illumination 4, is reflected from a mirror for folding 5 to an oblique or lower right direction in FIG. 1, and is directed to the curved mirror 6. Light having been reflected from the curve mirror 6 illuminates the DMD 7. As described above, an effective image area of the DMD 7 is illuminated with light generated from a surface light source while an exit of the integrator rod 3 is considered as a "surface light source with a uniform amount of light and no irregularity."

Light having illuminated an effective image area of the DMD 7 is reflected from micro-mirrors arranged on a surface of the DMD 7 and is incident on the projection optical system. Light having been outputted from the projection optical system 8 is projected onto the screen 20 so that an enlarged image is displayed on the screen 20.

Because the DMD 7 is illuminated with light that has an amount of light with no irregularity due to the illumination optical system described above to provide a uniform illuminance distribution, a projected image that is an enlarged image thereof also has a uniform illuminance distribution.

The DMD 7 is a device that includes many micro-mirrors wherein an angle of each micro-mirror is changed, for example, in a range of +12° to −12°. For example, when an angle of a micro-mirror is −12°, adjustment is conducted in such a manner that light reflected from that micro-mirror is incident on the projection optical system 8. On the other hand, when an angle of a micro-mirror is +12°, adjustment is conducted in such a manner that light reflected from that micro-mirror is not incident on a projection optical system. Each micro-mirror of the DMD 7 corresponds to a pixel of an image projected onto and displayed on the screen 20. Therefore, an inclination angle of a micro-mirror of the DMD 7 is controlled individually as described above, so that it is possible to form an enlarged image displayed on the screen 20.

Figure 2:
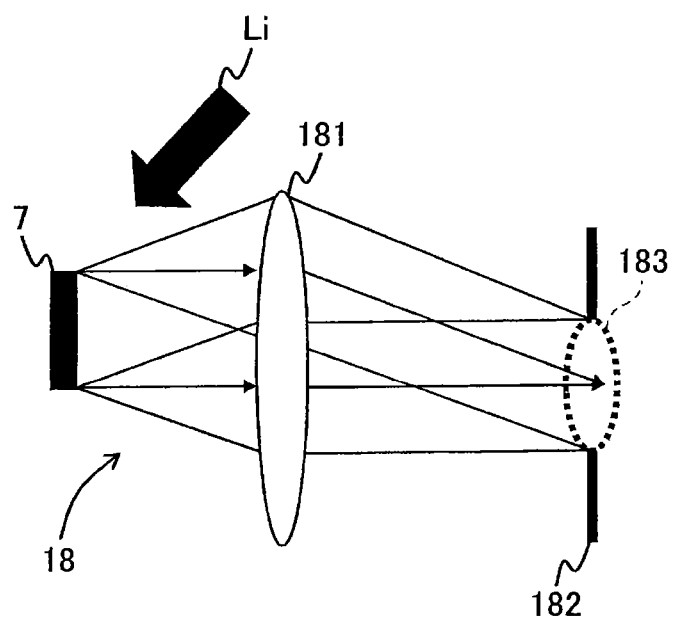
FIG. 2 is an optical arrangement diagram that illustrates a part of an example of a projection optical system that is telecentric with respect to an image display element.
Figure 3:
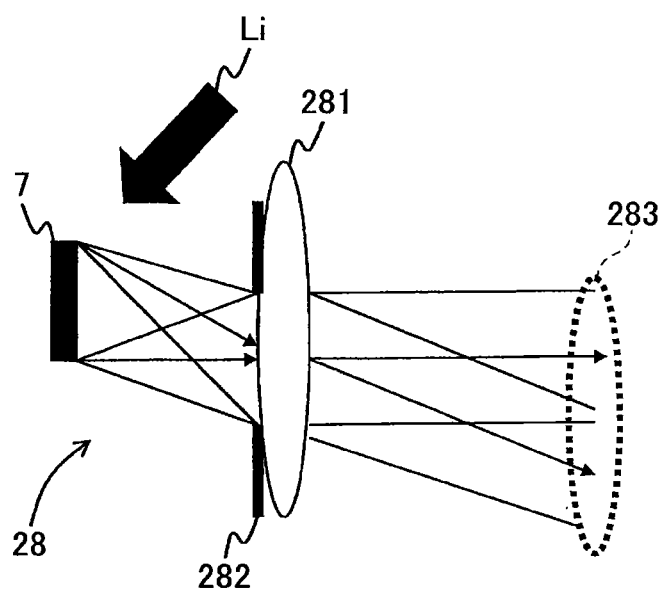
FIG. 3 is an optical arrangement diagram that illustrates a part of an example of a projection optical system that is non-telecentric with respect to an image display element.

Next, the projection optical system 8 that is a projection optical system according to an embodiment of the present invention will be described. The projection optical system 8 is a non-telecentric optical system. First, a non-telecentric projection optical system will be described while a telecentric projection optical system is compared therewith. FIG. 2 is an optical arrangement diagram that illustrates a part of an example of a projection optical system that is telecentric with respect to the DMD 7 that is an example of a reflection-type image display element. FIG. 3 is an optical arrangement diagram that illustrates a part of an example of a projection optical system that is non-telecentric with respect to the DMD 7.

As illustrated in FIG. 2, the projection optical system 18 that is telecentric with respect to the DMD 7 (that will be denoted as a "telecentric projection optical system 18" below) is such that an aperture stop 182 is arranged near a center of the telecentric projection optical system 18 in a direction of an optical axis thereof. All of principal rays that are illumination light Li reflected from the DMD 7 and directed to the telecentric projection optical system 18 are perpendicular to the DMD 7. Hence, a lens diameter of a lens 181 close to the DMD 7 among lenses that compose the telecentric projection optical system 18 tends to increase. However, light beams are entirely condensed at a condensation position 183 away from the DMD 7 in the telecentric projection optical system 18. Thereby, it is possible to decrease a lens diameter of a lens arranged at a position close to a mirror for reflecting and directing light having passed through the telecentric projection optical system 18 toward the screen 20 (see FIG. 1).

On the other hand, as illustrated in FIG. 3, a non-telecentric optical system 28 with respect to the DMD 7 (that will be denoted as "a non-telecentric projection optical system 28" below) is such that an aperture stop 282 is arranged at a position nearer the DMD 7 than a center of the non-telecentric projection optical system 28 in a direction of an optical axis thereof.

As illustrated in FIG. 3, light reflected from the DMD 7 illuminated with illumination light Li is not perpendicular to the DMD 7 and is obliquely incident on a lens 281 closest to the DMD 7. Accordingly, it may be necessary to increase a lens diameter of the lens 281 as a distance between the DMD 7 and the non-telecentric projection optical system 28 is increased.

Furthermore, light reflected from the DMD 7 is obliquely incident on the lens 281, and hence, light beams that are entirely incident on the non-telecentric projection optical system 28 are condensed at a position close to the DMD 7. Accordingly, a light beam is naturally and entirely broadened as it is separated from the DMD 7, as indicated by a reference numeral 283. Then, a lens diameter of a lens that is arranged at a position close to a mirror for reflecting light having passed through the non-telecentric projection optical system 28 toward the screen 20 (see FIG. 1) has to be increased. That is, the non-telecentric projection optical system 28 tends to increase in total size thereof.

Figure 4:
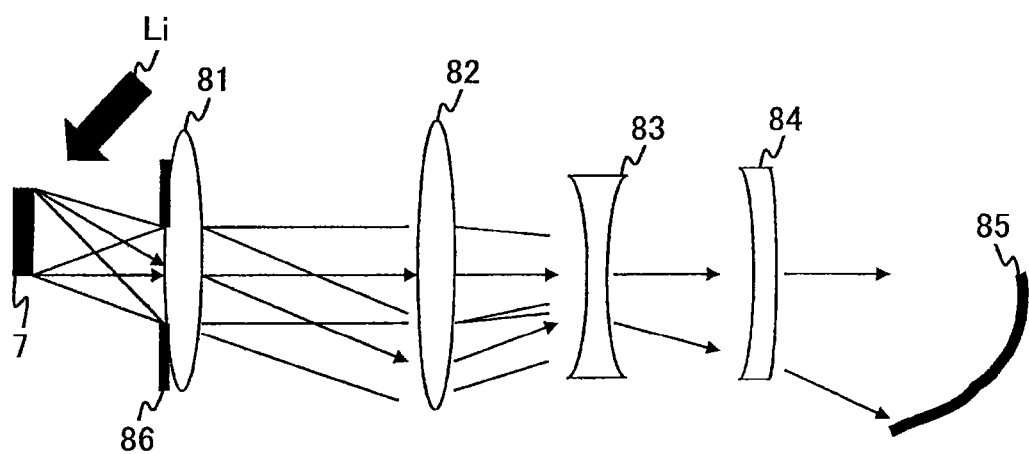
FIG. 4 is an optical arrangement diagram that illustrates an example of lens groups that compose a projection optical system according to an embodiment of the present invention.

Although the projection optical system 8 according to the present embodiment is a non-telecentric projection optical system, it may be possible to conduct miniaturization thereof without increasing a total size thereof. Accordingly, it may be necessary for a part of the refraction optical system to narrow a light beam that is naturally broadened as it is separated from the DMD 7. FIG. 4 is an optical arrangement diagram that illustrates an example of lens groups that compose the projection optical system 8.

In FIG. 4, the projection optical system 8 is configured to have a first lens group 81 that has a positive refractive power, a second lens group 82 that has a positive refractive power, a third lens group 83 that has a negative refractive power, a fourth lens group 84 that has one or more aspheric lenses or free-form lenses, and a concave mirror 85, in order from a side of the DMD 7 that is an image display element (a side of reduction) to a side of an image (a side of enlargement).

In FIG. 4, a light beam outputting from a top or bottom end portion of the DMD 7 among light beams outputting from respective points on the DMD 7 is represented by three lines and those three lines at or behind the third lens group are integrally represented by one line. As illustrated in FIG. 4, the second lens group 82 that has a positive refractive power is arranged just behind the first lens group 81. Due to action of such a second lens group, a light beam that is naturally broadened as it is separated from the DMD 7 is entirely and once narrowed. Thereby, it may be possible to prevent a lens diameter of a subsequent lens that composes the projection optical system 8 from increasing and reduce the lens diameter.

It may be necessary to provide a space for layout of an illumination optical system for illuminating the DMD 7, between the projection optical system 8 and the DMD 7. In order to provide such a space, it may be necessary to arrange the DMD 7 and the projection optical system 8 as being separated by a predetermined distance. A distance between the DMD 7 and a lens surface closest to the DMD 7 among lenses that compose the projection optical system 8 is referred to as a back focus (Bf). Unless such a back focus is ensured, it may be impossible for light reflected from the DMD 7 to be incident on the projection optical system 8.

In order to ensure a back focus, it may be necessary to arrange a lens group that has a strong negative refractive power at a position away from the DMD 7 and arrange a lens group that has a positive refractive power at a position close to the DMD 7. Therefore, the projection optical system 8 is such that the first lens group 81 has a positive refractive power and the third lens group 83 has a negative refractive power.

Furthermore, the projection optical system 8 is such that the fourth lens group 84 is arranged next to the third lens group 83. This is due to the following reason. For example, if a projection optical system has a larger distance (projection distance) from the concave mirror 85 to the screen 20 (see FIG. 1), it may be possible to satisfy an optical property (in particular, a distortion aberration or a curvature of field) even when the fourth lens group 84 is not arranged next to the third lens group 83 that has a negative refractive power.

The projection optical system 8 according to the present embodiment is capable of attaining "projection in a highly close range" wherein a distance to a screen is even smaller than that of conventional projection in a close range. Hence, it may be necessary to provide a proper refractive power and control a direction of travel of a light ray for each light beam output (reflected) from each point on the DMD 7. If a light beam is received by a lens with a sufficiently larger lens diameter, each light beam is separated, and hence, it may be possible to provide proper action for each light beam basically. However, the projection optical system 8 is intended to be compact, and hence, a lens diameter is limited by the second lens group 82. Accordingly, the projection optical system 8 is such that an aspheric lens or a free-form lens is used for the fourth lens group 84. Thereby, it may be possible to provide each light beam with a proper action even if a lens diameter is smaller.

Here, a "larger projection distance" refers to, for example, a projection optical system with a throw ratio greater than 0.35. Whereas a case where a throw ratio is about 0.35 is usually referred to as a close-in optical system, a projection optical system with a throw ratio less than 0.35 is referred to as a "highly close range" in the present specification and a projection distance that is no less than it is represented by a "larger projection distance".

The concave mirror 85 has a mirror surface with a shape that is rotationally asymmetric or a free-form surface. Such a concave mirror 85 may compensate for degradation of an optical property that is caused in a case where a lens diameter of a lens that composes a refractive optical system that is from the first lens group 81 to the fourth lens group 84 is decreased. In particular, it may be possible to compensate for degradation in distortion or curvature of field thereof. Furthermore, when the concave mirror 85 has a free-form surface, it may be possible to attain a sufficiently high optical property even if an amount of a separation between respective light beams on the concave mirror 85 is smaller, and it may also be possible to decrease a size of the concave mirror 85.

Figure 5:
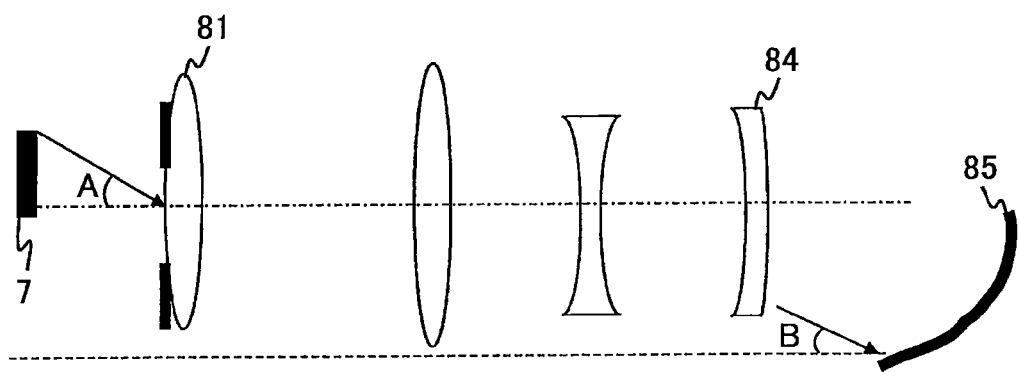
FIG. 5 is a diagram that illustrates an angle of a principal ray folded by the projection optical system described above.

Furthermore, the projection optical system 8 is a non-telecentric optical system, and hence, it may be possible to reduce an angle for folding a principal ray. FIG. 5 is a diagram that illustrates an angle of a principal ray folded by the projection optical system 8. As illustrated in FIG. 5, when an angle of incidence of a principal ray on the first lens group 81 from the DMD 7 is "A" and an angle of a principal ray directed from the fourth lens group 84 to the concave mirror is "B", a difference (A−B) between the angle A and the angle B in the projection optical system 8 may be reduced. Thereby, if the projection optical system 8 is composed of lenses whose number is identical to that of the telecentric optical system, it may be possible to reduce generation of aberration comparatively.

Returning to FIG. 4, the projection optical system 8 is such that a lens surface closest to the second lens group 82 among lenses that compose the first lens group 81 is a convex surface facing the concave mirror 85, that is, facing the second lens group 82. Thereby, an effect of causing a light beam directed to the second lens group 82 to approach an optical axis may be produced and an effect of the second lens group 82 may be produced for assisting to decrease a diameter of a lens near the concave mirror 85.

Furthermore, the projection optical system 8 is such that an aperture stop 86 is arranged between the DMD 7 and the first lens group 81. Thereby, it may be possible for the projection optical system 8 to limit a light beam captured from the DMD 7 and it may be possible to decrease a size of the projection optical system 8.

When the projection optical system 8 conducts focusing of an image displayed on the screen 20 that is a surface subjected to projection, the first lens group 81 is not moved (or is fixed) and the second lens group 82 and the third lens group 83 are moved by mutually different amounts. Directions of movement of the second lens group 82 and the third lens group 83 are identical in a direction of an optical axis of the projection optical system 8.

For focusing in projection in a highly close range, correction of a curvature of field aberration based on a floating focus may be effective. As the second lens group 82 that has a positive refractive power and the third lens group 83 that has a negative refractive power are moved in identical directions in a direction of an optical axis of the projection optical system 8, mutually opposite actions may be exerted with respect to a curvature of field. That is, as the second lens group 82 that has a positive refractive power is moved to a side of the DMD 7, an image surface is focused to be convex at a side of the DMD 7. However, as the third lens group 83 that has a negative refractive power is moved to a side of the DMD 7, an image surface is focused to be concave at a side of the DMD 7. Hence, mutual actions may be canceled.

However, as the second lens group 82 that has a positive refractive power and the third lens group 83 that has a negative refractive power are moved in an identical direction in a direction of an optical axis of the projection optical system 8, it may be possible to conduct fine focusing for each image position.

Herein, "fine focusing for each image position" will be described. When a projection distance to the screen 20 is reduced (the screen 20 approaches the concave mirror 85) to change an "image position", an amount of adjustment of a focus of that image for an image on a top portion of the screen 20 may be larger than that for an image on a bottom portion of the screen 20.

When focusing is conducted in accordance with a position of the screen 20 (or in accordance with a position of an image), it may be possible to move a focus position so as to be close to the concave mirror 85 with respect to a current position even if only the second lens group 82 is moved to a side of an image. Hence, it may also be possible for only the second lens group 82 to conduct focusing. However, when only the second lens group 82 is moved to a side of an image, a focus position does not move perpendicularly to the screen 20 but an image on a lower portion moves more greatly than an image on an upper portion due to generation of a curvature of field. That is, when only the second lens group 82 is moved to a side of an image, a focus position moves obliquely with respect to the screen 20.

When only the third lens group 83 is moved to a side of an image, a focus position is moved so as to be far away from the concave mirror 85 with respect to a current position. Herein, when a focus position does also not move perpendicularly to the screen 20 but moves obliquely, an image on a lower portion moves more greatly than an image on an upper portion.

Due to such a difference of focus movement between the second lens group 82 and the third lens group 83, it may be possible to move the second lens group 82 and the third lens group 83 in the same direction in such a manner that a focus correction effect of the third lens group 83 is provided to a focus that is moved by the second lend group 82. Thereby, it may be possible to readily conduct focusing for an entire image to be projected on the screen 20 and it may be possible to conduct fine focusing for each image position.

Furthermore, when an image to be displayed on the screen 20 is focused in the projection optical system 8, the fourth lens group 84 is also moved. It may be possible to move the fourth lens group 84 configured to have an aspheric lens or a free-form lens in such a manner that adjustment of distortion is conducted that is changed for each projection distance. Here, a lens group with a weaker refractive power may further be included that has an aspheric lens or free-form lens that moves at time of focusing.

Furthermore, in the projection optical system 8, an aperture stop 86 may be arranged between lenses that compose the first lens group 81. In this case, it is preferable for a position for arranging the aperture stop 86 to be a side of the DMD 7 with respect to a position of a focus in a case where parallel light rays that are directed from the DMD 7 to the concave mirror 85, are perpendicular to the DMD 7, and are parallel to an optical axis of the first lens group 81 are incident thereon.

As the aperture stop 86 is arranged in the first lens group 81, the aperture stop 86 is not moved. Accordingly, even when each lens group separation is changed depending on a size of an image to be displayed on the screen 20, it may be possible to maintain a maximum amount of light constantly without changing an amount of light from an illumination optical system and incident on the projection optical system 8.

Figure 6:
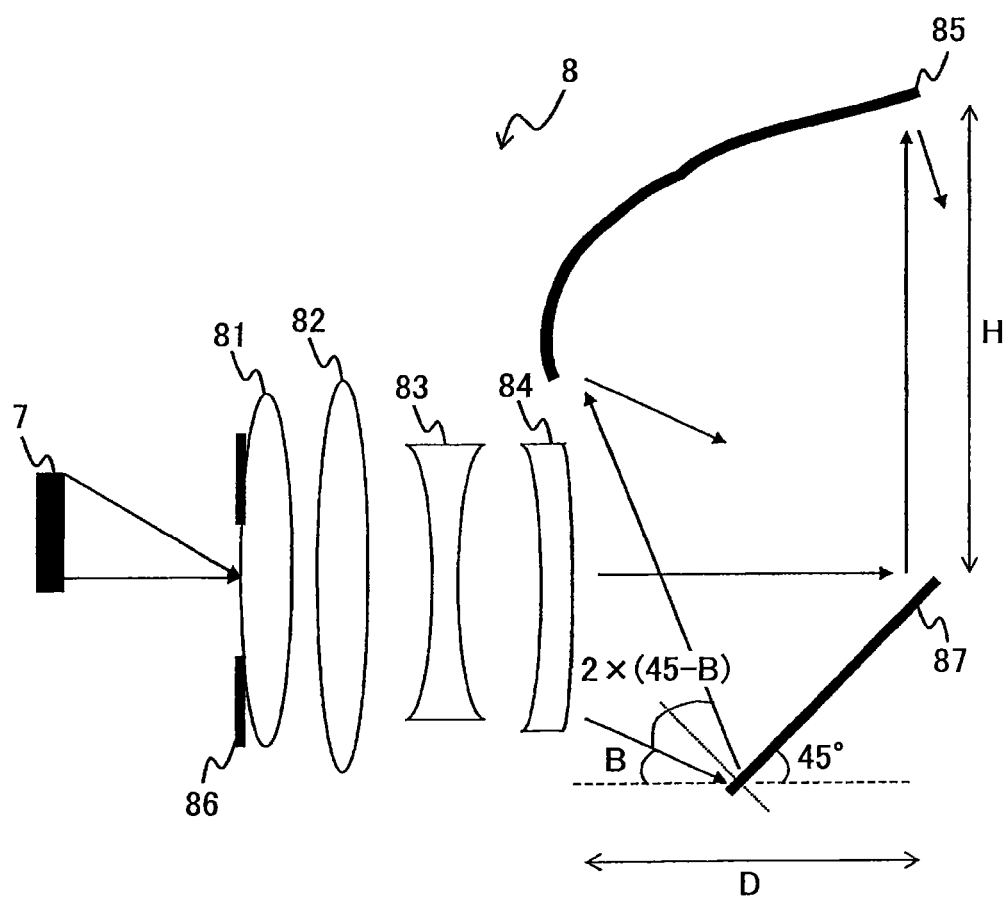
FIG. 6 is an optical arrangement diagram that illustrates a projection optical system according to another embodiment of the present invention.

Next, a projection optical system according to another embodiment of the present invention will be described. FIG. 6 is an optical arrangement diagram that illustrates another example of the projection optical system 8 according to the present embodiment. In FIG. 6, the projection optical system 8 is such that a folding mirror 87 is arranged in a space between a refractive optical system composed of a first lens group 81, a second lens group 82, a third lens group 83, and a fourth lens group 84 and a concave mirror 85. That is, the folding mirror 87 is arranged between the fourth lens group 84 and the concave mirror 85. The folding mirror 87 is a plane mirror.

As illustrated in FIG. 6, a light beam directed from a center of the DMD 7 in a direction of a long side thereof to the projection optical system 8 is refracted by the refractive optical system composed of the first lens group 81, the second lens group 82, the third lens group 83, and the fourth lens group 84, and subsequently, is directed to the folding mirror 87. The projection optical system 8 according to the present embodiment is characterized in that a principal ray of a light beam directed to the folding mirror 87 (or a light ray passing through a center of the aperture stop 86) is less than or equal to 30° with respect to an axis line perpendicular to the DMD 7.

As the folding mirror 87 is arranged between the refractive optical system and the concave mirror 85 as illustrated in FIG. 6, a light beam directed from the folding mirror 87 to the concave mirror 85 may be shaded by the refractive optical system. Such shading caused by the refractive optical system is produced when an angle B of a light ray output from the refractive optical system is greater than 30° in a case where a lens diameter is decreased due to the second lens group 82.

In order to avoid shading caused by the refractive optical system, it may be sufficient to increase a distance D between the refractive optical system and the folding mirror 87. However, even though the folding mirror 87 is separated from the refractive optical system by increasing the distance D, it may be necessary to keep a distance from the refractive optical system to the concave mirror 85 in a predetermined range. Accordingly, a distance H between the folding mirror 87 and the concave mirror 85 may have to be decreased.

However, as the folding mirror 87 is brought close to the concave mirror 85 by decreasing the distance H, a possibility may be caused that light reflected from the concave mirror 85 is shaded by the folding mirror 87 before being directed to the screen 20. Because it may be necessary to increase a distance between the refractive optical system and the concave mirror 85 in order to avoid this matter, a size of the projection optical system 8 may be increased.

Herein, the refractive optical system in the projection optical system 8 is configured in such a manner that an angle of a light ray output from the refractive optical system is controlled to be less than or equal to 30° in order to decrease a lens diameter in the projection optical system 8 and produce no shading. Here, in this case, adoption of a free-form surface for the concave mirror 85 may be an essential condition.

Here, although the folding mirror 87 is inclined by 45° with respect to a principal ray in FIG. 6, the angle of the folding mirror 87 is not necessarily limited to 45°. However, it may be necessary to be at least around 45°.

Practical Example 1

Figure 7:
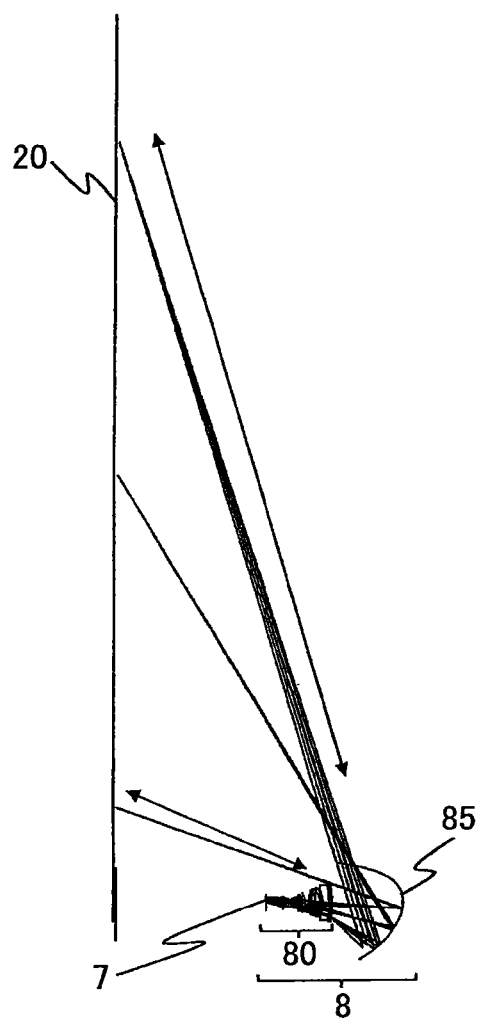
FIG. 7 is an optical path diagram of a practical example of a projection optical system according to an embodiment of the present invention.

Next, a more detailed practical example of a projection optical system according to an embodiment of the present invention will be described. FIG. 7 is an optical path diagram of a projection optical system 8 according to the present practical example. In FIG. 7, the projection optical system 8 is configured to have a refractive optical system 80 configured to have a plurality of lens groups and a concave mirror 85 that is a free-form mirror. Light from the DMD 7 and incident on the refractive optical system 80 is reflected from a concave mirror 85 and projected onto a screen 20.

Figure 8:
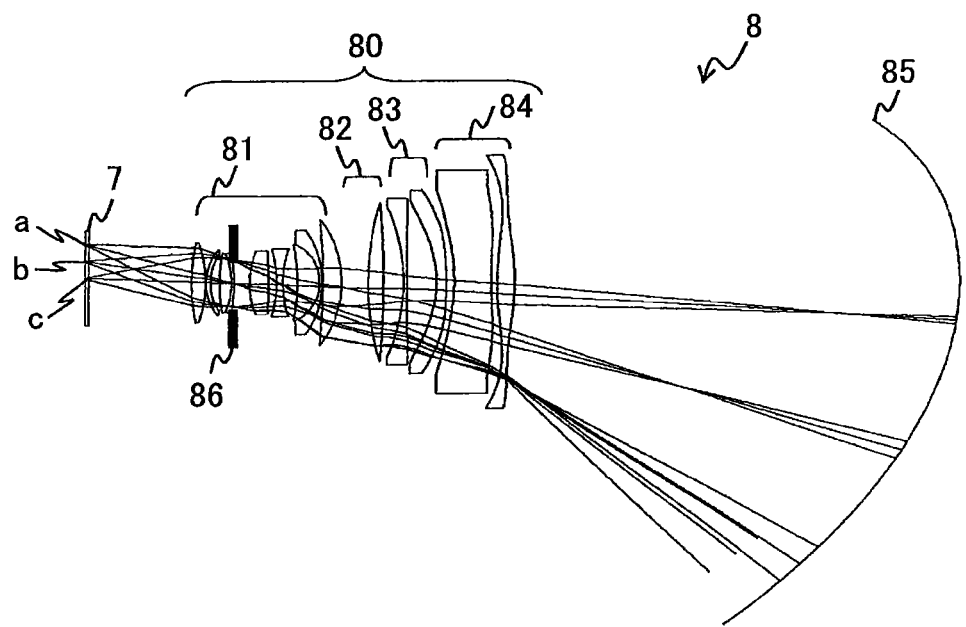
FIG. 8 is a detailed optical arrangement diagram of a practical example of the projection optical system described above.

FIG. 8 is a detailed optical arrangement diagram of the projection optical system 8 according to the present practical example. In FIG. 8, the refractive optical system 80 that composes the projection optical system 8 is composed of a first lens group 81, a second lens group 82, a third lens group 83, and a fourth lens group 84.

The first lens group 81 is a lens group that is composed of nine spherical lenses (lens L11 to lens L19), is not moved at a time of focusing (or is fixed), and has a positive refractive power.

The second lens group 82 is a lens group that is composed of one spherical lens (L21), is moved at a time of focusing (or is movable), and has a positive refractive power.

The third lens group 83 is a lens group that is composed of one spherical lens (L31) and one aspheric lens (L32), is moved at a time of focusing (or is movable), and has a negative refractive power.

The fourth lens group 84 is a lens group that is composed of two aspheric lenses (L41 and L42), is moved at a time of focusing (or is movable), and has a weaker and positive refractive power. Here, a focal length of the fourth lens group 84 is 1310 mm.

An aperture stop 86 is arranged in the first lens group 81, and hence, is not moved at a time of focusing. Thereby, an amount of light introduced from an illumination optical system to the projection optical system 8 is not changed even by changing a lens group separation at a time of focusing.

FIG. 8 illustrates lens group separations in a case where a size of an image to be displayed on a screen is 80 inches (or at a time of projection of a 80 inch image). When an image with a size that is less than 80 inches is projected, the second lens group 82 is moved to a side of the DMD 7 along an optical axis of the refractive optical system 80 (an axis in a direction perpendicular to the DMD 7), and similarly, the third lens group 83 is moved to a side of the DMD 7. Additionally, the fourth lens group 84 is moved to a side of the DMD 7 similarly. It may be sufficient to conduct focusing due to movement of each of these lens groups. In this case, amounts of movement of respective lens groups are different amounts.

The reason why each lens group is moved as described above is that a distance from the concave mirror 85 to the screen 20 is different between a light ray to be projected on an upper portion of the screen 20 and a light ray to be projected onto a lower portion of the screen 20. That is because an upper portion of the screen 20 may be far and a lower portion of the screen 20 may be close (see FIG. 7). For example, when the screen 20 is close to a side of the concave mirror 85, an amount of focusing on an upper portion of the screen 20 is clearly greater than that of a lower portion of the screen 20. Therefore, the first lens group 81 to the fourth lens group 84 that compose the refractive optical system 80 are not moved in unity (or the DMD 7 is not moved in an optical axis thereof) to conduct focusing but each of the plurality of lens groups is moved by a different amount. Thereby, a floating focus is conducted for focusing entirely and also controlling a curvature of field simultaneously.

Furthermore, a throw ratio at a time of projection of an 80 inch image in the projection optical system 8 according to Practical Example 1 is "0.29" (wherein a width of an image is 1718 mm and a projection distance is 501 mm). This throw ratio is less than 0.35 that is a reference for projection in a highly close range. Hence, the projection optical system 8 according to Practical Example 1 is a projection optical system capable of projection in a highly close range.

In the projection optical system 8 with a smaller throw ratio, light beams that spread from point a, point b, and point c on the DMD 7 as illustrated in FIG. 8, respectively, may have to be separated sufficiently at the third lens group 83, the fourth lens group 84, and the concave mirror 85. That is because it may be impossible to conduct correction of a distortion or correction of a curvature of field on the screen 20 in a case where a sufficient separation is not provided. As the configuration is applied to a conventional technique, it may be necessary to compose the third lens group 83 and the fourth lens group 84 of lenses with a larger size.

Furthermore, the projection optical system 8 in Practical Example 1 is a non-telecentric optical system wherein the aperture stop 86 is arranged at a position nearer the DMD 7 than a position of focusing in a case where a light beam perpendicular to the DMD 7 (that is, parallel to an optical axis of the refractive optical system 80) is introduced from a side of the DMD 7 to the first lens group 81.

A light beam output from point a (or a point furthest from an optical axis) on the DMD 7 is incident on the projection optical system 8 with an angle, and hence, lens diameters from the aperture stop 86 to the fourth lens group 84 may have to be increased.

Whereas a size increase is caused in application to a conventional technique, the projection optical system 8 in the present practical example is such that a surface of a lens closest to the second lens group 82 in the first lens group 81 is a convex surface and further the second lens group 82 is a lens group that has a positive refractive power, so that it may be possible to decrease a size thereof.

That is, light beams outputting from the first lens group 81 are first condensed (refracted upward in FIG. 8) and then are made incident on the third lens group 83, and the light beams are separated by a negative refractive power of the third lens group 83 again.

Furthermore, if the third lens group 83 were to be arranged just behind the first lens group 81, a floating focus function would not sufficiently work. Hence, the second lens group 82 has functions of condensation of light beams and a floating focus. Thereby, decreasing of a lens diameter and focusing in projection in a highly close range may be possible. In particular, the second lens group 82 and the third lens group 83 are configured to share a function of correction of a curvature of field.

Furthermore, as an aspheric lens and a free-form lens are used, it may be possible to correct aberration sufficiently even by a smaller lens diameter or a smaller mirror size. Therefore, an aspheric lens and a free-form lens are used for the projection optical system 8, so that it may be possible to realize a higher quality image (or an image with a smaller distortion and a smaller curvature of field) even by a smaller lens diameter, and it may also be possible to decrease a size of the concave mirror 85.

As is clear in FIG. 8, the fourth lens group 84 is arranged at a position where a light beam is most thin. Hence, it is desirable for a function of the fourth lens group 84 to concentrate on correction of a distortion without sufficiently contributing to condensation or dispersion of light rays, that is, a curvature of field. Accordingly, the fourth lens group 84 is configured to have a refractive power that is a positive or negative weaker refractive power and be composed of two aspheric lenses.

Furthermore, it may be possible for the concave mirror 85 to have a free-form surface so that a size of the concave mirror 85 is decreased. In addition, it may also be possible to assist correction of a distortion or a curvature of field of the projection optical system 80 and contribute to decreasing of a size of a lens diameter.

As described above, it may be possible for the projection optical system 8 according to the present practical example to decrease a lens diameter and a size of a concave mirror and project a higher quality image even in a non-telecentric optical system provided with a reflection-type optical element such as the DMD 7.

Next, a specific example of numerical values of the projection optical system 8 according to Practical Example 1 will be illustrated below. Table 1 is layout data of the projection optical system 8 according to Practical Example 1.

TABLE 1

| SURFACE NUMBER | RADIUS OF CURVATURE | DISTANCE | REFRACTIVE INDEX (d LINE) & ABBE NUMBER | APERTURE RADIUS |
|---|---|---|---|---|
| LB(0) | 1.0E+18 | 1.000 | | |
| 1 | 1.0E+18 | 1.000 | 1.5168 | |
| | | | 64.1 | |
| 2 | 1.0E+18 | 28.000 | | |
| 3 | 46.159 | 3.731 | 1.49369 | |
| | | | 73.25 | |
| 4 | −28.665 | 0.300 | | |
| 5 | 1.2E+01 | 1.198 | 1.69148 | |
| | | | 29.86 | |
| 6 | 12.428 | 2.350 | | |
| 7 | 34.822 | 3.311 | 1.49758 | |
| | | | 78.28 | |
| 8 | −17.689 | 0.800 | 1.81082 | |
| | | | 35.58 | |
| APERTURE STOP | −38.733 | 4.200 | | 5.95 |
| 10 | 20.565 | 5.047 | 1.49924 | |
| | | | 80.91 | |
| 11 | −151.525 | 2.378 | | |
| 12 | −27.076 | 1.764 | 1.87471 | |
| | | | 30.31 | |
| 13 | 25.218 | 3.943 | | |
| 14 | −40.902 | 6.138 | 1.55366 | |
| | | | 45.31 | |
| 15 | −10.244 | 0.700 | 1.90187 | |
| | | | 36.00 | |
| 16 | −21.305 | 0.300 | | |
| 17 | −121.747 | 5.239 | 1.76680 | |
| | | | 26.24 | |
| 18 | −23.712 | 7.265 | | |
| 19 | 65.608 | 4.218 | 1.67949 | |
| | | | 41.74 | |
| 20 | −216.256 | 5.547 | | |
| 21 | −41.664 | 1.000 | 1.80786 | |
| | | | 46.94 | |

TABLE 1-continued

| | | | | |
|---|---|---|---|---|
| 22 | 1414.022 | 8.154 | | |
| 23 | −2.59E+01 | 2.602 | 1.49700 | |
| | | | 81.61 | |
| 24 | −100.696 | 2.276 | | |
| 25 | −41.716 | 10.170 | 1.55985 | |
| | | | 67.14 | |
| 26 | 99.790 | 1.616 | | |
| 27 | 58.812 | 4.748 | 1.48749 | |
| | | | 70.24 | |
| 28 | −51.020 | 121.944 | | |
| CONCAVE MIRROR SCREEN | 1.0E+18 | −500.963 | | |

| SURFACE NUMBER | DECENTERING Y (LB END PORTION -) | DECENTERING α(CROSS-SECTION INCLUDING AN OPTICAL AXIS Z AND AN LB TRANSVERSE DIRECTION) | ASPHERIC SURFACE | FREE-FORM SURFACE |
|---|---|---|---|---|
| LB(0) | 0 | 0 | | |
| 1 | 0 | | | |
| 2 | 0 | 0 | | |
| 3 | −1.236 | 0 | | |
| 4 | −1.236 | 0 | | |
| 5 | −1.236 | 0 | | |
| 6 | −1.236 | 0 | | |
| 7 | −1.236 | 0 | | |
| 8 | −1.236 | 0 | | |
| APERTURE STOP | −1.236 | 0 | | |
| 10 | −1.236 | 0 | | |
| 11 | −1.236 | 0 | | |
| 12 | −1.236 | 0 | | |
| 13 | −1.236 | 0 | | |
| 14 | −1.236 | 0 | | |
| 15 | −1.236 | 0 | | |
| 16 | −1.236 | 0 | | |
| 17 | −1.236 | 0 | | |
| 18 | −1.236 | 0 | | |
| 19 | −1.236 | 0 | | |
| 20 | −1.236 | 0 | | |
| 21 | −1.236 | 0 | | |
| 22 | −1.236 | 0 | | |
| 23 | −1.236 | 0 | • | |
| 24 | −1.236 | 0 | • | |
| 25 | −1.236 | 0 | • | |
| 26 | −1.236 | 0 | • | |
| 27 | −1.236 | 0 | • | |
| 28 | −1.236 | 0 | • | |
| CONCAVE MIRROR SCREEN | 0.498 | 1.782 | | • |

In Table 1, surface numbers 23, 24, 25, 26, 27, and 28 indicate aspheric surfaces. Table 2 illustrates coefficients of these aspheric surfaces.

TABLE 2

| | SURFACE NUMBER | | |
|---|---|---|---|
| | 23 | 24 | 25 |
| 4-TH ORDER COEFFICIENT (A) | −3.314017E−07 | −2.102474E−05 | 7.964670E−06 |
| 6-TH ORDER COEFFICIENT (B) | 3.964552E−08 | 1.290857E−08 | −9.337855E−10 |

| | SURFACE NUMBER | | |
|---|---|---|---|
| | 26 | 27 | 28 |
| 4-TH ORDER COEFFICIENT (A) | −2.337093E−05 | −1.547141E−05 | 1.650895E−05 |
| 6-TH ORDER COEFFICIENT (B) | 1.923529E−08 | 3.95416E−09 | −8.513753E−09 |

A formula for calculating an aspheric surface by applying coefficients of the aspheric surface as described above thereto is represented by formula 1.

$$D = \frac{C \cdot H^2}{1 + \sqrt{1 - (1+K) \cdot C^2 \cdot H^2}} + E_4 \cdot H^4 + E_6 \cdot H^6 + E_8 \cdot H^8 + E_{10} \cdot H^{10} + \ldots \quad \text{Formula 1}$$

Table 3 illustrates a separation between lens groups (or a group separation) at each surface number in a case where a size of a projected image is 80 inches or 48 inches.

TABLE 3

| SURFACE NUMBER | GROUP DISTANCE | |
| --- | --- | --- |
| | 80 inches | 48 inches |
| 18 | 7.265 | 1.650 |
| 20 | 5.547 | 7.183 |
| 24 | 2.276 | 3.050 |
| 28 | 121.944 | 125.150 |
| 29 | −500.963 | −322.605 |

Table 4 illustrates coefficients for forming surface number 29. Here, in Table 4, "*" represents a multiplication and "**" represents an exponentiation operation.

TABLE 4

| | SURFACE NUMBER: 29 |
| --- | --- |
| C | 0 |
| K: CONIC CONSTANT | 0 |
| C2: y | 0 |
| C3: X**2 | −0.009397013 |
| C4: Y**2 | −0.009798894 |
| C5: X**2 * Y | 6.64898E−06 |
| C6: Y**3 | −3.06234E−05 |
| C7: X**4 | 5.66565E−07 |
| C8: X**2 * Y**2 | 1.17146E−06 |
| C9: Y**4 | −9.07759E−07 |
| C10: X**4 * Y | 2.22933E−10 |
| C11: X**2 * Y**3 | 2.25472E−08 |
| C12: Y**5 | −2.41754E−08 |
| C13: X**6 | −1.651E−10 |
| C14: X**4 * Y**2 | −2.98557E−10 |
| C15: X**2 * Y**4 | 4.85951E−10 |
| C16: Y**6 | −2.48765E−10 |
| C17: X**6 * Y | −4.31617E−13 |
| C18: X**4 * Y**3 | −4.0559E−12 |
| C19: X**2 * Y**5 | 8.08901E−12 |
| C20: Y**7 | 3.42835E−13 |
| C21: X**8 | 3.06424E−14 |
| C22: X**6 * Y**2 | 3.24615E−14 |
| C23: X**4 * Y**4 | −7.87989E−14 |
| C24: X**2 * Y**6 | 1.50098E−14 |
| C25: Y**8 | 1.65738E−14 |
| C26: X**8 * Y | 8.69625E−17 |
| C27: X**6 * Y**3 | 1.42151E−16 |
| C28: X**4 * Y**5 | −1.496E−15 |
| C29: X**2 * Y**7 | −7.8675E−16 |
| C30: Y**9 | 1.69283E−17 |
| C31: X**10 | −2.65386E−18 |
| C32: X**8 * Y**2 | −1.28946E−18 |
| C33: X**6 * Y**4 | −2.47324E−18 |
| C34: X**4 * Y**6 | −9.95358E−18 |
| C35: X**2 * Y**8 | −5.50136E−18 |
| C36: Y**10 | −4.869580E−19 |

A formula for calculating a surface number 29 by applying coefficients as described above thereto is represented by formula 2.

$$z = \frac{cr^2}{1 + \sqrt{1 - (1+k)c^2 r^2}} + \sum_{j=2}^{72} c_j x^m y^n. \quad \text{Formula 2}$$

Herein, z is an amount of sag of a surface parallel to a z-axis, c is a curvature at an apex (CUY), k is a conic constant, and $c_j$ is a coefficient of a monomial $x^m y^n$.

It may be possible for the projection optical system 8 according to Practical Example 1 as described above to obtain a projection optical system that is capable of decreasing a diameter of a lens close to the concave mirror 85, capable of decreasing a size of the concave mirror 85, capable of projection in a highly close range, and capable of decreasing an entire size.

Practical Example 2

Figure 9:
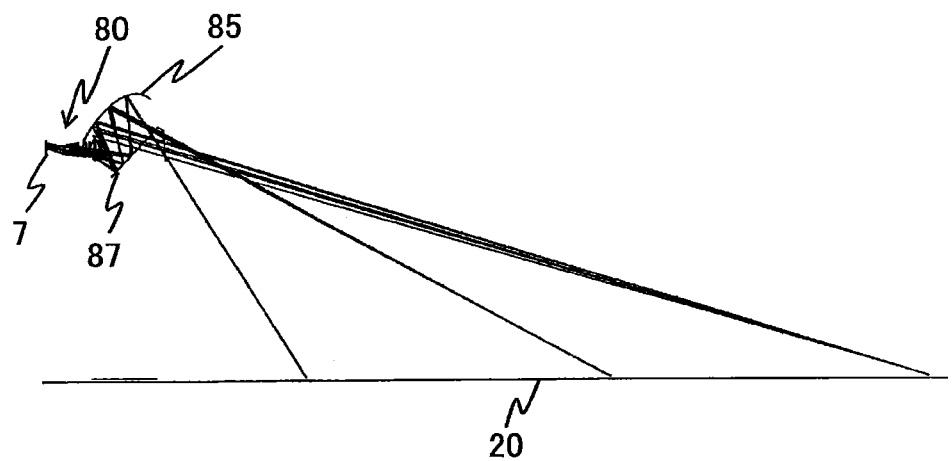
FIG. 9 is an optical path diagram of another practical example of a projection optical system according to an embodiment of the present invention.
Figure 10:
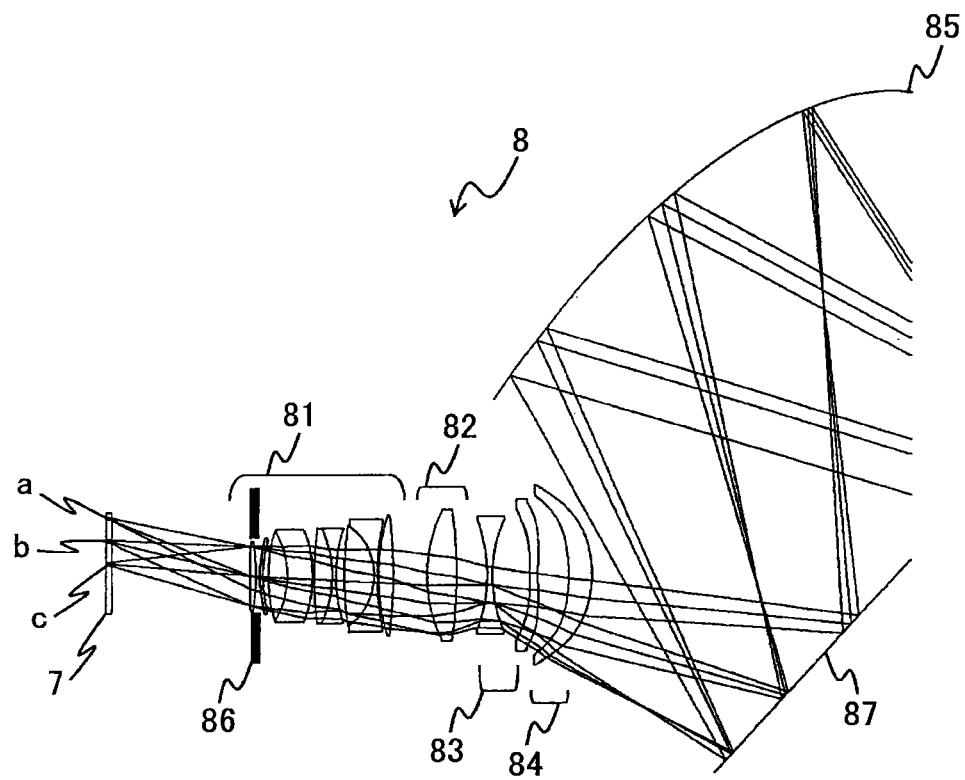
FIG. 10 is a detailed optical arrangement diagram of another practical example of the projection optical system described above.

Next, a projection optical system according to another practical example of the present invention will be described. FIG. 9 is an optical path diagram of a projection optical system 8 according to the preset practical example. Furthermore, FIG. 10 is a detailed optical arrangement diagram of the projection optical system 8 according to the present practical example. A different point between Practical Example 2 and Practical Example 1 is that a folding mirror 87 is arranged between a refractive optical system 80 and a concave mirror 85. It may be possible to arrange the folding mirror 87 so that a space between the refractive optical system 80 and the concave mirror 85 is reduced.

As an angle of a principal ray of a light beam outputting from point a on the DMD 7 as illustrated in FIG. 10 (or a light ray passing through a center of an aperture stop 86) with respect to an optical axis at a time of being directed to the folding mirror 87 is greater than or equal to 30°, shading may be caused by the refractive optical system 80 after being reflected from the folding mirror 87.

As the concave mirror 85 is arranged in a right portion of FIG. 10 (or a direction away from an optical axis of the refractive optical system 80) in order to avoid such shading, it may be necessary to keep a positional relationship between the refractive optical system 80 and the concave mirror 85, and hence, the concave mirror 85 may have to be arranged in a bottom portion of FIG. 10. Accordingly, a light beam outputting from point a on the DMD 7 in FIG. 10 is reflected from the concave mirror 85 and subsequently shaded by the folding mirror 87.

In order to avoid such shading and decrease a size of the projection optical system 8 (or minimize a layout space between the refractive optical system 80 and the concave mirror 85), an angle as described above may have to be less than or equal to 30°. This angle in the projection optical system 8 according to Practical Example 2 is 27°.

Furthermore, a throw ratio of the projection optical system 8 according to Practical Example 2 is "0.26" that is greatly less than 0.35 that is a reference of projection in a highly close range. Hence, the projection optical system 8 according to Practical Example 2 is a projection optical system in a highly close range.

A specific example of numerical values of the projection optical system 8 according to Practical Example 2 will be illustrated below. Table 5 is layout data of the projection optical system 8 according to Practical Example 2.

TABLE 5

| SURFACE NUMBER | RADIUS OF CURVATURE | DISTANCE | REFRACTIVE INDEX (c LINE) & ABBE NUMBER | APERTURE RADIUS |
| --- | --- | --- | --- | --- |
| LB(0) | −.0E+18 | 1.000 | | |
| 1 | −.0E+18 | 1.000 | 1.5168 64.1 | |
| 2 | −.0E+18 | 28.000 | | |

TABLE 5-continued

| | | | | |
|---|---|---|---|---|
| APERTURE STOP | 313.919 | 1.125 | 1.56574 42.91 | 5.4 |
| 4 | −41.700 | 0.781 | | |
| 5 | 2.5E+01 | 0.604 | 1.89164 31.01 | |
| 6 | 22.136 | 0.896 | | |
| 7 | 1.0E+18 | 0.100 | | |
| 8 | 25.211 | 4.015 | 1.49700 81.61 | |
| 9 | −14.749 | 5.031 | 1.85181 29.89 | |
| 10 | −21.210 | 0.300 | | |
| 11 | 58.569 | 3.535 | 1.51664 76.06 | |
| 12 | −19.957 | 0.700 | 1.86543 30.47 | |
| 13 | 26.165 | 1.665 | | |
| 14 | 60.267 | 6.013 | 1.84666 23.78 | |
| 15 | −10.788 | 0.700 | 1.81335 29.69 | |
| 16 | 43.287 | 0.300 | | |
| 17 | 35.087 | 3.001 | 1.81417 46.69 | |
| 18 | −89.258 | 0.000 | | |
| 19 | 1.0E+18 | 6.827 | | |
| 20 | 25.439 | 5.874 | 1.70913 51.84 | |
| 21 | −82.749 | 6.025 | | 11 |
| 22 | −27.315 | 1.000 | 1.85118 41.33 | |
| 23 | 2.44E+01 | 7.323 | | |
| 24 | −87.146 | 1.661 | 1.53000 56.00 | |
| 25 | 109.787 | 6.212 | | |
| 26 | −31.015 | 4.666 | 1.53000 56.00 | |
| 27 FIRST MIRROR (PLANE MIRROR) SECOND MIRROR (CONCAVE MIRROR) SCREEN | −20.220 | 60.994 | | |

| SURFACE NUMBER | DECENTERING Y (LB END PORTION −) | DECENTERING α(CROSS-SECTION INCLUDING AN OPTICAL AXIS Z AND AN LB TRANSVERSE DIRECTION) | ASPHERIC SURFACE | FREE-FORM SURFACE |
|---|---|---|---|---|
| LB(0) | 0 | 0 | | |
| 1 | 0 | | | |
| 2 | 0 | 0 | | |
| APERTURE STOP | −2.439 | 0 | | |
| 4 | −2.439 | 0 | | |
| 5 | −2.439 | 0 | | |
| 6 | −2.439 | 0 | | |
| 7 | −2.439 | 0 | | |
| 8 | −2.439 | 0 | | |
| 9 | −2.439 | 0 | | |
| 10 | −2.439 | 0 | | |
| 11 | −2.439 | 0 | | |
| 12 | −2.439 | 0 | | |
| 13 | −2.439 | 0 | | |
| 14 | −2.439 | 0 | | |
| 15 | −2.439 | 0 | | |
| 16 | −2.439 | 0 | | |
| 17 | −2.439 | 0 | | |
| 18 | −2.439 | 0 | | |
| 19 | −2.439 | 0 | | |
| 20 | −2.439 | 0 | | |
| 21 | −2.439 | 0 | | |
| 22 | −2.439 | 0 | | |
| 23 | −2.439 | 0 | | |
| 24 | −2.439 | 0 | • | |
| 25 | −2.439 | 0 | • | |

TABLE 5-continued

| | | | |
|---|---|---|---|
| 26 | −2.439 | 0 | • |
| 27 | −2.439 | 0 | • |
| FIRST MIRROR (PLANE MIRROR) | | | |
| SECOND MIRROR (CONCAVE MIRROR) | | | • |
| SCREEN | | | |

In Table 5, surface numbers 24, 25, 26, and 27 indicate aspheric surfaces. Table 6 illustrates coefficients of these aspheric surfaces.

TABLE 6

| | SURFACE NUMBER | |
|---|---|---|
| | 24 | 25 |
| 4-TH ORDER COEFFICIENT (A) | −9.346371E−05 | −1.098184E−04 |
| 6-TH ORDER COEFFICIENT (B) | −2.009836E−07 | 3.566201E−08 |
| 8-TH ORDER COEFFICIENT (C) | 1.279564E−09 | 3.824728E−10 |
| 10-TH ORDER COEFFICIENT (D) | 4.677615E−12 | −8.487454E−13 |
| 12-TH ORDER COEFFICIENT (E) | 0.00E+00 | 0.00E+00 |

| | SURFACE NUMBER | |
|---|---|---|
| | 26 | 27 |
| 4-TH ORDER COEFFICIENT (A) | −4.067320E−05 | −1.118940E−05 |
| 6-TH ORDER COEFFICIENT (B) | −1.220569E−08 | −1.644780E−07 |
| 8-TH ORDER COEFFICIENT (C) | −2.200349E−09 | 6.744822E−10 |
| 10-TH ORDER COEFFICIENT (D) | 1.035623E−11 | −6.081986E−12 |
| 12-TH ORDER COEFFICIENT (E) | −1.236722E−14 | 1.723823E−14 |

A formula for calculating an aspheric surface by applying coefficients of the aspheric surface as described above thereto is identical to formula 1 as illustrated in Practical Example 1.

Table 7 illustrates a separation between lens groups (or a group separation) at each surface number in a case where a size of a projected image is 80 inches or 48 inches.

TABLE 7

| | GROUP DISTANCE | |
|---|---|---|
| SURFACE NUMBER | 80 inches | 48 inches |
| 19 | 6.827 | 2.000 |
| 21 | 6.025 | 6.188 |
| 25 | 6.212 | 7.616 |
| 27 | 60.994 | 64.255 |

Table 8 illustrates coefficients for forming surface number 29. Here, in Table 4, "*" represents a multiplication and "**" represents an exponentiation operation.

TABLE 8

| | SURFACE NUMBER: 29 |
|---|---|
| C | 0 |
| K: CONIC CONSTANT | 0 |
| C2: y | 0 |
| C3: $X^{**}2$ | 0.010519028 |
| C4: $Y^{**}2$ | 0.013721529 |
| C5: $X^{**}2 * Y$ | −4.52368E−05 |
| C6: $Y^{**}3$ | 7.13004E−05 |
| C7: $X^{**}4$ | −9.27173E−07 |
| C8: $X^{**}2 * Y^{**}2$ | −2.87101E−06 |
| C9: $Y^{**}4$ | 1.23652E−06 |
| C10: $X^{**}4 * Y$ | −7.59171E−09 |
| C11: $X^{**}2 * Y^{**}3$ | −4.69415E−08 |
| C12: $Y^{**}5$ | 2.45279E−08 |
| C13: $X^{**}6$ | 2.50428E−10 |
| C14: $X^{**}4 * Y^{*}2$ | 4.82079E−10 |
| C15: $X^{**}2 * Y^{**}4$ | −5.09933E−10 |
| C16: $Y^{**}6$ | 2.46796E−10 |
| C17: $X^{**}6 * Y$ | 6.17432E−12 |
| C18: $X^{**}4 * Y^{**}3$ | 9.73419E−12 |
| C19: $X^{**}2 * Y^{**}5$ | −6.47543E−12 |
| C20: $Y^{**}7$ | −4.30337E−13 |
| C21: $X^{**}8$ | −3.54187E−14 |
| C22: $X^{**}6 * Y^{**}2$ | 4.84093E−14 |
| C23: $X^{**}4 * Y^{**}4$ | 9.10128E−14 |
| C24: $X^{**}2 * Y^{**}6$ | −1.45097E−14 |
| C25: $Y^{**}8$ | −1.69279E−14 |
| C26: $X^{**}8 * Y$ | −7.00172E−16 |
| C27: $X^{**}6 * Y^{**}3$ | 5.88688E−18 |
| C28: $X^{**}4 * Y^{**}5$ | 9.5494E−16 |
| C29: $X^{**}2 * Y^{**}7$ | 6.9435E−16 |
| C30: $Y^{**}9$ | 4.22338E−18 |
| C31: $X^{**}10$ | 2.25052E−18 |
| C32: $X^{**}8 * Y^{**}2$ | −6.34919E−18 |
| C33: $X^{**}6 * Y^{**}4$ | 1.51186E−18 |
| C34: $X^{**}4 * Y^{**}6$ | 7.09843E−18 |
| C35: $X^{**}2 * Y^{**}8$ | 5.51846E−18 |
| C36: $Y^{**}10$ | 7.010394E−19 |

Table 9 illustrates a "surface apex reference" of a lens surface closest to a first mirror L11 that composes the first lens group 81. In Table 9, "screen distance 1" indicates a position of a screen at a time of 110 inch projection and "screen distance 2" indicates a position of a screen at a time of 60 inch projection. A reference of coordinates of each component is coordinates of an apex of a surface closest to the folding mirror 87 in the refractive optical system 80. Here, X, Y, and Z in Table 9 indicate distances from an X-axis, a Y-axis, and a Z-axis from reference coordinate. The Z-axis is an axis parallel to an optical axis. The X-axis is an axis in a direction perpendicular to the Z-axis and an axis parallel to a longitudinal direction of the DMD 7. The Y-axis is an axis perpendicular to the Z-axis and the X-axis.

TABLE 9

A REFERENCE SURFACE APEX OF A LENS
SURFACE CLOSEST TO A FIRST MIRROR

|  | X | Y | Z | α |
|---|---|---|---|---|
| FIRST MIRROR (PLANE MIRROR) | 0 | 0 | 60.99358 | −45 |
| SECOND MIRROR (CONCAVE MIRROR) | 0 | 88.999 | 64.634 | −97.348 |
| SCREEN DISTANCE 1 | 0 | −363 | — | −90 |
| SCREEN DISTANCE 2 | 0 | −261 | — | −90 |

It may be possible for the projection optical system 8 according to Practical Example 2 as described above to obtain a projection optical system 8 capable of decreasing a diameter of a lens close to the concave mirror 85, decreasing a size of the concave mirror 85, conducting projection in a highly close range, and decreasing an entire size.

Practical Example 3

Figure 11:
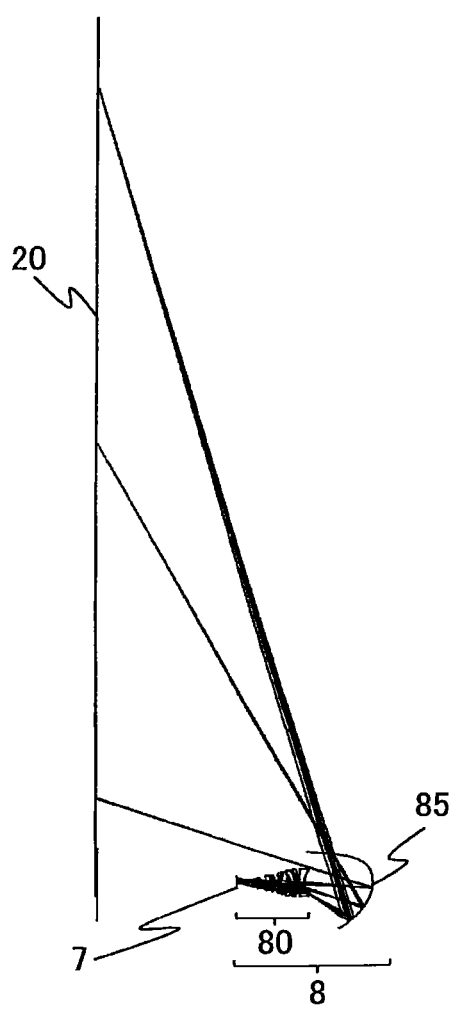
FIG. 11 is an optical path diagram of yet another practical example of a projection optical system according to an embodiment of the present invention.
Figure 12:
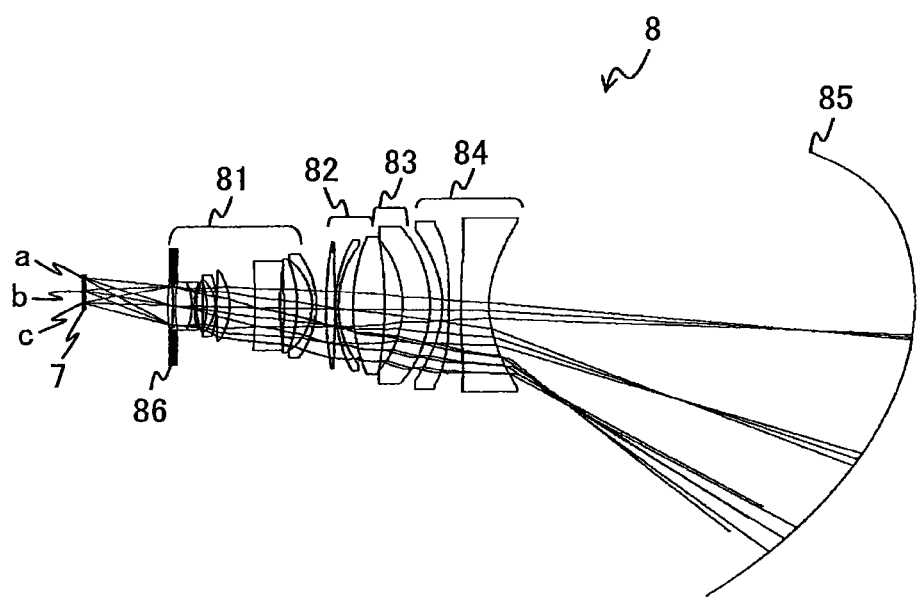
FIG. 12 is a detailed optical arrangement diagram of yet another practical example of the projection optical system described above.

Next, a projection optical system according to yet another practical example of the present invention will be described. FIG. 11 is an optical path diagram of a projection optical system 8 according to the preset practical example. Furthermore, FIG. 12 is a detailed optical arrangement diagram of the projection optical system 8 according to the present practical example.

A different point between the projection optical system 8 according to Practical Example 3 and that of Practical Example 1 is that a second lens group 82 is composed of three spherical lenses, a focal length is decreased by 47 mm from 74 mm in Practical Example 1 (that is, a refractive power is increased), and further, a lens diameter of the fourth lens group 84 is decreased. Here, a third lens group 83 according to Practical Example 3 is composed of one lens that has a negative refractive power and a fourth lens group 84 is composed of two aspheric lenses.

A specific example of numerical values of the projection optical system 8 according to Practical Example 3 will be illustrated below. Table 10 is layout data of the projection optical system 8 according to Practical Example 3.

TABLE 10

| SURFACE NUMBER | RADIUS OF CURVATURE | DISTANCE | REFRACTIVE INDEX (d LINE) & ABBE NUMBER | APERTURE RADIUS |
|---|---|---|---|---|
| LB(0) | 1.0E+18 | 1.000 | | |
| 1 | 1.0E+18 | 30.000 | | |
| 2 | 40.247 | 2.097 | 1.53027 | |
| | | | 72.84 | |
| 3 | −39.983 | 0.100 | | |
| APERTURE STOP | 1.0E+18 | 0.706 | | 6.35 |
| 4 | 38.430 | 6.008 | 1.93654 | |
| | | | 18.13 | |
| 5 | −16.750 | 0.771 | 1.92387 | |
| | | | 25.51 | |
| 6 | 20.343 | 0.845 | | |
| 7 | 22.909 | 2.238 | 1.51238 | |
| | | | 77.16 | |
| 8 | −249.524 | 1.455 | | |
| 9 | −21.521 | 3.101 | 1.58583 | |
| | | | 63.21 | |
| 10 | −11.128 | 0.542 | 1.92269 | |
| | | | 22.23 | |
| 11 | −30.526 | 0.145 | | |
| 12 | 329.506 | 4.595 | 1.54662 | |
| | | | 66.14 | |
| 13 | −19.051 | 9.244 | | |
| 14 | −182.376 | 9.007 | 1.80429 | |
| | | | 36.30 | |
| 15 | 103.786 | 1.383 | | |
| 16 | −358.794 | 4.785 | 1.67736 | |
| | | | 47.38 | |
| 17 | −38.222 | 5.112 | | |
| 18 | −18.265 | 1.483 | 1.58541 | |
| | | | 63.27 | |
| 19 | −27.683 | 3.567 | | |
| 20 | 110.081 | 3.236 | 1.80277 | |
| | | | 47.14 | |
| 21 | −3.87E+02 | 0.100 | | |
| 22 | 41.483 | 1.000 | 1.85296 | |
| | | | 19.68 | |
| 23 | 30.231 | 5.289 | | |
| 24 | 55.108 | 11.482 | 1.73352 | |
| | | | 23.33 | |
| 25 | −104.652 | 6.558 | | |
| 26 | −31.590 | 10.000 | 1.83007 | |
| | | | 40.79 | |
| 27 | −36.486 | 4.517 | | |
| 28 | −34.888 | 2.239 | 1.56413 | |
| | | | 66.43 | |
| 29 | 438.401 | 4.420 | | |

TABLE 10-continued

| | | | | |
|---|---|---|---|---|
| 30 | 204.521 | 10.000 | 1.57888 | |
| | | | 64.18 | |
| 31 | 37.743 | 152.118 | | |
| CONCAVE MIRROR SCREEN | 1.0E+18 | −618.821 | | |

| SURFACE NUMBER | DECENTERING Y (LB END PORTION -) | DECENTERING α(CROSS-SECTION INCLUDING AN OPTICAL AXIS Z AND AN LB TRANSVERSE DIRECTION) | ASPHERIC SURFACE | FREE-FORM SURFACE |
|---|---|---|---|---|
| LB(0) | 0 | 0 | | |
| 1 | −1.053 | 0 | | |
| 2 | −1.053 | 0 | | |
| 3 | −1.053 | 0 | | |
| APERTURE STOP | −1.053 | 0 | | |
| 4 | −1.053 | 0 | | |
| 5 | −1.053 | 0 | | |
| 6 | −1.053 | 0 | | |
| 7 | −1.053 | 0 | | |
| 8 | −1.053 | 0 | | |
| 9 | −1.053 | 0 | | |
| 10 | −1.053 | 0 | | |
| 11 | −1.053 | 0 | | |
| 12 | −1.053 | 0 | | |
| 13 | −1.053 | 0 | | |
| 14 | −1.053 | 0 | | |
| 15 | −1.053 | 0 | | |
| 16 | −1.053 | 0 | | |
| 17 | −1.053 | 0 | | |
| 18 | −1.053 | 0 | | |
| 19 | −1.053 | 0 | | |
| 20 | −1.053 | 0 | | |
| 21 | −1.053 | 0 | | |
| 22 | −1.053 | 0 | | |
| 23 | −1.053 | 0 | | |
| 24 | −1.053 | 0 | | |
| 25 | −1.053 | 0 | | |
| 26 | −1.053 | 0 | | |
| 27 | −1.053 | 0 | | |
| 28 | −1.053 | 0 | • | |
| 29 | −1.053 | 0 | • | |
| 30 | −1.053 | 0 | • | |
| 31 | −1.053 | 0 | • | |
| CONCAVE MIRROR SCREEN | 4.886 | 4.792 | | • |

In Table 10, surface numbers 28, 29, 30, and 31 indicate aspheric surfaces. Table 11 illustrates coefficients of these aspheric surfaces.

TABLE 11

| | SURFACE NUMBER | |
|---|---|---|
| | 28 | 29 |
| 4-TH ORDER COEFFICIENT (A) | −1.112646E−05 | −2.306499E−05 |
| 6-TH ORDER COEFFICIENT (B) | 3.818850E−08 | 3.196423E−08 |
| 8-TH ORDER COEFFICIENT (C) | −3.271360E−11 | −2.639339E−11 |
| 10-TH ORDER COEFFICIENT (D) | 7.397376E−15 | 6.159793E−15 |
| 12-TH ORDER COEFFICIENT (E) | 0.00E+00 | 0.00E+00 |

TABLE 11-continued

| | SURFACE NUMBER | |
|---|---|---|
| | 30 | 31 |
| 4-TH ORDER COEFFICIENT (A) | 1.000867E−06 | −6.536127E−06 |
| 6-TH ORDER COEFFICIENT (B) | −8.908101E−09 | 2.930092E−09 |
| 8-TH ORDER COEFFICIENT (C) | 8.199618E−12 | −1.715305E−11 |
| 10-TH ORDER COEFFICIENT (D) | −5.411937E−15 | 2.079050E−14 |
| 12-TH ORDER COEFFICIENT (E) | 3.653303E−18 | −1.062748E−17 |

A formula for calculating an aspheric surface by applying coefficients of the aspheric surface as described above thereto is identical to formula 1 as illustrated in Practical Example 1.

Table 12 illustrates a separation between lens groups (or a group separation) at each surface number in a case where a size of a projected image is 110 inches or 60 inches.

TABLE 12

| SURFACE NUMBER | GROUP DISTANCE | |
|---|---|---|
| | 110 inches | 60 inches |
| 19 | 3.567 | 1.353 |
| 25 | 6.558 | 7.558 |
| 27 | 4.517 | 3.144 |
| 31 | 152.118 | 154.704 |
| 32 | −618.8215 | −359.006 |

Table 13 illustrates coefficients for forming surface number 32. Here, in Table 13, "*" represents a multiplication and "**" represents an exponentiation operation.

TABLE 13

| | SURFACE NUMBER: 32 |
|---|---|
| C | 0 |
| K: CONIC CONSTANT | 0 |
| C2: y | 0 |
| C3: X**2 | −0.008162347 |
| C4: Y**2 | −0.007772325 |
| C5: X**2 * Y | 3.87134E−07 |
| C6: Y**3 | −1.23145E−05 |
| C7: X**4 | 2.87232E−07 |
| C8: X**2 * Y**2 | 1.07067E−07 |
| C9: Y**4 | −1.23812E−06 |
| C10: X**4 * Y | 4.66056E−09 |
| C11: X**2 * Y**3 | 1.26654E−08 |
| C12: Y**5 | −2.94416E−08 |
| C13: X**6 | −5.70474E−11 |
| C14: X**4 * Y**2 | 8.33707E−11 |
| C15: X**2 * Y**4 | 6.53638E−10 |
| C16: Y**6 | −2.432E−10 |
| C17: X**6 * Y | −7.59183E−13 |
| C18: X**4 * Y**3 | 9.72391E−13 |
| C19: X**2 * Y**5 | 1.02222E−11 |
| C20: Y**7 | 5.7967E−13 |
| C21: X**8 | 5.49488E−15 |
| C22: X**6 * Y**2 | −1.8664E−14 |
| C23: X**4 * Y**4 | −8.39046E−14 |
| C24: X**2 * Y**6 | −1.45991E−15 |
| C25: Y**8 | 1.47902E−14 |
| C26: X**8 * Y | 1.8447E−17 |
| C27: X**6 * Y**3 | −6.27241E−16 |
| C28: X**4 * Y**5 | −1.93413E−15 |

TABLE 13-continued

| | SURFACE NUMBER: 32 |
|---|---|
| C29: X**2 * Y**7 | −1.09419E−15 |
| C30: Y**9 | 4.54593E−18 |
| C31: X**10 | −2.92942E−19 |
| C32: X**8 * Y**2 | −7.92767E−19 |
| C33: X**6 * Y**4 | −5.83237E−18 |
| C34: X**4 * Y**6 | −1.15249E−17 |
| C35: X**2 * Y**8 | −6.36972E−18 |
| C36: Y**10 | −3.933418E−19 |

It may be possible for the projection optical system 8 according to Practical Example 3 as described above to obtain a projection optical system capable of decreasing a diameter of a lens close to the concave mirror 85, decreasing a size of the concave mirror 85, conducting projection in a highly close range, and decreasing an entire size.

Practical Example 4

Figure 13:
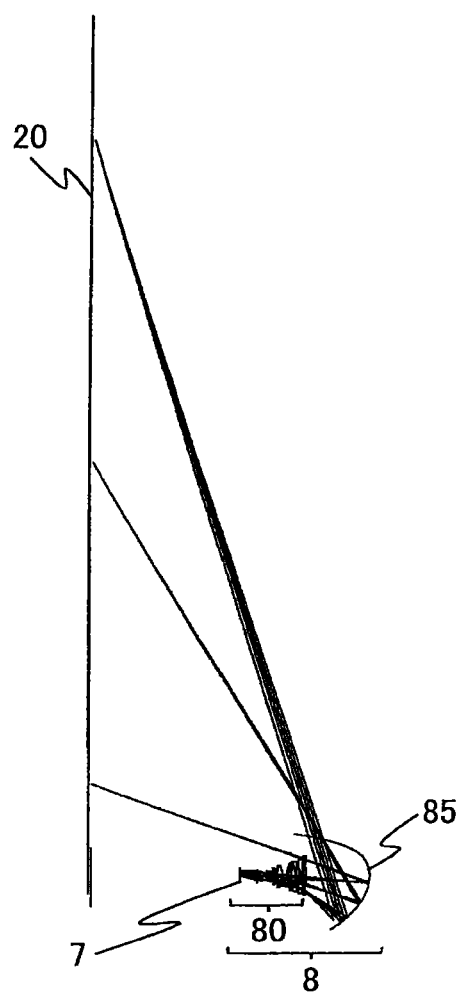
FIG. 13 is an optical path diagram of yet another practical example of a projection optical system according to an embodiment of the present invention.
Figure 14:
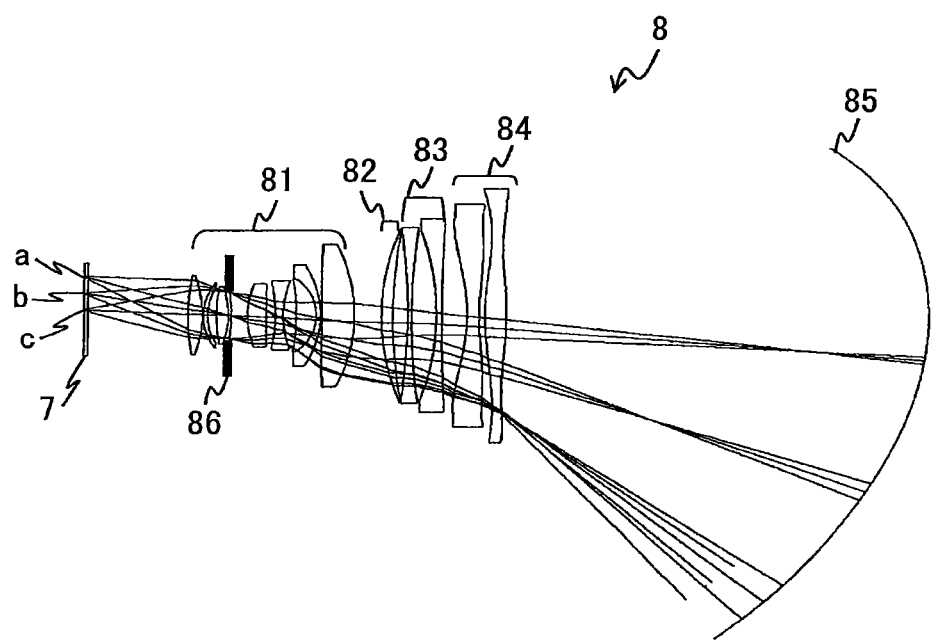
FIG. 14 is a detailed optical arrangement diagram of yet another practical example of the projection optical system described above.

Next, a projection optical system according to yet another practical example of the present invention will be described. FIG. 13 is an optical path diagram of a projection optical system 8 according to the preset practical example. Furthermore, FIG. 14 is a detailed optical arrangement diagram of the projection optical system 8 according to the present practical example.

A different point between the projection optical system 8 according to Practical Example 4 and the configuration of Practical Example 1 is that a third lens group 83 is composed of two spherical lenses that have a negative refractive power and a fourth lens group 84 is composed of one aspheric lens and one free-form lens.

Freedom of a shape of a free-form surface is higher than that of an aspheric surface, and in particular, a free-form lens is used for the fourth lens group 84 to exert an effect of correction of a distortion. Accordingly, the number of an aspheric lens(es) has been reduced by using a free-form lens for the fourth lens 84.

A specific example of numerical values of the projection optical system 8 according to Practical Example 4 will be illustrated below. Table 14 is layout data of the projection optical system 8 according to Practical Example 4.

TABLE 14

| SURFACE NUMBER | RADIUS OF CURVATURE | DISTANCE | REFRACTIVE INDEX (d LINE) & ABBE NUMBER | APERTURE RADIUS |
|---|---|---|---|---|
| LB(0) | 1.0E+18 | 1.000 | | |
| 1 | 1.0E+18 | 1.000 | 1.5168 | |
| | | | 64.1 | |
| 2 | 1.0E+18 | 28.000 | | |
| 3 | 46.301 | 3.803 | 1.49171 | |
| | | | 74.92 | |
| 4 | −28.587 | 0.300 | | |
| 5 | 1.2E+01 | 1.182 | 1.81440 | |
| | | | 24.66 | |
| 6 | 11.847 | 2.497 | | |
| 7 | 34.137 | 3.356 | 1.49738 | |
| | | | 81.49 | |
| 8 | −17.379 | 0.800 | 1.80619 | |
| | | | 33.63 | |
| APERTURE STOP | −37.773 | 4.594 | | 5.95 |
| 10 | 19.113 | 5.366 | 1.49700 | |
| | | | 81.61 | |

TABLE 14-continued

| | | | | |
|---|---|---|---|---|
| 11 | −1325.078 | 2.373 | | |
| 12 | −33.822 | 2.112 | 1.87790 | |
| | | | 33.80 | |
| 13 | 22.871 | 3.604 | | |
| 14 | −40.455 | 5.522 | 1.55719 | |
| | | | 44.57 | |
| 15 | −10.367 | 1.155 | 1.89710 | |
| | | | 36.42 | |
| 16 | −21.305 | 0.300 | | |
| 17 | 732.368 | 9.169 | 1.77335 | |
| | | | 27.19 | |
| 18 | −34.433 | 7.336 | | |
| 19 | 47.341 | 3.312 | 1.72574 | |
| | | | 49.76 | |
| 20 | 99.437 | 4.269 | | |
| 21 | −135.534 | 1.000 | 1.70971 | |
| | | | 51.80 | |
| 22 | 141.928 | 6.694 | | |
| 23 | −5.70E+01 | 1.500 | 1.49700 | |
| | | | 81.61 | |
| 24 | 327.935 | 7.034 | | |
| 25 | −39.083 | 3.286 | 1.57257 | |
| | | | 65.11 | |
| 26 | 58.260 | 1.574 | | |
| 27 | 46.315 | 5.909 | 1.53233 | |
| | | | 50.61 | |
| 28 | −59.705 | 116.367 | | |
| CONCAVE MIRROR SCREEN | 1.0E+18 | −501.093 | | |

| SURFACE NUMBER | DECENTERING Y (LB END PORTION -) | DECENTERING α(CROSS-SECTION INCLUDING AN OPTICAL AXIS Z AND AN LB TRANSVERSE DIRECTION) | ASPHERIC SURFACE | FREE-FORM SURFACE |
|---|---|---|---|---|
| LB(0) | 0 | 0 | | |
| 1 | 0 | | | |
| 2 | 0 | 0 | | |
| 3 | −1.325 | 0 | | |
| 4 | −1.325 | 0 | | |
| 5 | −1.325 | 0 | | |
| 6 | −1.325 | 0 | | |
| 7 | −1.325 | 0 | | |
| 8 | −1.325 | 0 | | |
| APERTURE STOP | −1.325 | 0 | | |
| 10 | −1.325 | 0 | | |
| 11 | −1.325 | 0 | | |
| 12 | −1.325 | 0 | | |
| 13 | −1.325 | 0 | | |
| 14 | −1.325 | 0 | | |
| 15 | −1.325 | 0 | | |
| 16 | −1.325 | 0 | | |
| 17 | −1.325 | 0 | | |
| 18 | −1.325 | 0 | | |
| 19 | −1.325 | 0 | | |
| 20 | −1.325 | 0 | | |
| 21 | −1.325 | 0 | | |
| 22 | −1.325 | 0 | | |
| 23 | −1.325 | 0 | | |
| 24 | −1.325 | 0 | | |
| 25 | −1.325 | 0 | • | |
| 26 | −1.325 | 0 | • | |
| 27 | −1.325 | 0 | | • |
| 28 | −1.325 | 0 | | • |
| CONCAVE MIRROR SCREEN | −1.630 | −0.049 | | • |

In Table 14, surface numbers 25 and 26 indicate aspheric surfaces. Table 15 illustrates coefficients of these aspheric surfaces.

TABLE 15

| SURFACE NUMBER | | |
|---|---|---|
| | 25 | 26 |
| 4-TH ORDER COEFFICIENT (A) | 1.146523E−05 | −2.340761E−05 |
| 6-TH ORDER COEFFICIENT (B) | 3.709642E−09 | 1.778994E−08 |

A formula for calculating an aspheric surface by applying coefficients of the aspheric surface as described above thereto is identical to formula 1 as illustrated in Practical Example 1.

Table 16 illustrates a separation between lens groups (or a group separation) at each surface number in a case where a size of a projected image is 80 inches or 48 inches.

TABLE 16

| | GROUP DISTANCE | |
|---|---|---|
| SURFACE NUMBER | 80 inches | 48 inches |
| 18 | 7.336 | 1.650 |
| 20 | 4.269 | 6.565 |
| 24 | 7.034 | 7.690 |
| 28 | 116.367 | 119.101 |
| 29 | −501.093 | −322.591 |

Table 17 illustrates coefficients for forming surface number 29. Here, in Table 17, "*" represents a multiplication and "**" represents an exponentiation operation.

TABLE 17

| | SURFACE NUMBER: 29 |
|---|---|
| C | 0 |
| K: CONIC CONSTANT | 0 |
| C2: y | 0 |
| C3: X**2 | −0.009202379 |
| C4: Y**2 | −0.009264533 |
| C5: X**2 * Y | 3.11425E−06 |
| C6: Y**3 | −2.6808E−05 |
| C7: X**4 | 4.44598E−07 |
| C8: X**2 * Y**2 | 1.09388E−06 |
| C9: Y**4 | −9.20382E−07 |
| C10: X**4 * Y | −1.00919E−10 |
| C11: X**2 * Y**3 | 2.3987E−08 |
| C12: Y**5 | −2.44208E−08 |
| C13: X**6 | −1.42802E−10 |
| C14: X**4 * Y**2 | −2.96626E−10 |
| C15: X**2 * Y**4 | 4.94399E−10 |
| C16: Y**6 | −2.48109E−10 |
| C17: X**6 * Y | −5.16921E−13 |
| C18: X**4 * Y**3 | −4.19819E−12 |
| C19: X**2 * Y**5 | 7.94908E−12 |
| C20: Y**7 | 3.50774E−13 |
| C21: X**8 | 2.76194E−14 |
| C22: X**6 * Y**2 | 3.07744E−14 |
| C23: X**4 * Y**4 | −7.74441E−14 |
| C24: X**2 * Y**6 | 1.57093E−14 |
| C25: Y**8 | 1.64395E−14 |
| C26: X**8 * Y | 1.31734E−16 |
| C27: X**6 * Y**3 | 1.39695E−16 |
| C28: X**4 * Y**5 | −1.48897E−15 |
| C29: X**2 * Y**7 | −7.83048E−16 |
| C30: Y**9 | 1.76746E−17 |
| C31: X**10 | −2.46671E−18 |
| C32: X**8 * Y**2 | −6.04987E−19 |
| C33: X**6 * Y**4 | −3.00331E−18 |

TABLE 17-continued

| | SURFACE NUMBER: 29 |
|---|---|
| C34: X**4 * Y**6 | −1.03216E−17 |
| C35: X**2 * Y**8 | −5.66758E−18 |
| C36: Y**10 | −4.766284E−19 |

Table 18 illustrates coefficients for forming surface numbers 27 and 28. Here, in Table 18, "*" represents a multiplication and "**" represents an exponentiation operation.

TABLE 18

| | SURFACE NUMBER: 27 | SURFACE NUMBER: 28 |
|---|---|---|
| C | 0 | 0 |
| K: CONIC CONSTANT | 0 | 0 |
| C2: y | 0 | 0 |
| C3: X**2 | −2.664947E−04 | 2.16250E−03 |
| C4: Y**2 | −1.48875E−03 | 1.03667E−03 |
| C5: X**2 * Y | 4.12550E−05 | 6.62277E−06 |
| C6: Y**3 | −1.64083E−05 | 1.10635E−05 |
| C7: X**4 | −1.59191E−05 | 1.20053E−05 |
| C8: X**2 * Y**2 | −3.32462E−05 | 1.78769E−05 |
| C9: Y**4 | −1.40916E−05 | 1.51814E−05 |
| C10: X**4 * Y | −1.49775E−07 | −1.02445E−07 |
| C11: X**2 * Y**3 | 1.10670E−08 | −7.63040E−08 |
| C12: Y**5 | −1.46802E−08 | 6.80352E−09 |
| C13: X**6 | 1.21762E−08 | −2.20486E−10 |
| C14: X**4 * Y**2 | 9.81435E−09 | −2.05658E−08 |
| C15: X**2 * Y**4 | 1.63120E−07 | −1.71142E−08 |
| C16: Y**6 | 3.67243E−09 | −7.67399E−09 |

It may be possible for the projection optical system 8 according to Practical Example 4 as described above to obtain a projection optical system capable of decreasing a diameter of a lens close to the concave mirror 85, decreasing a size of the concave mirror 85, conducting projection in a highly close range, and decreasing an entire size.

As described above, a projection optical system according to an embodiment of the present invention is composed of a positive lens group, a positive lens group, a negative lens group, one or more lens groups with an aspheric surface or a free-form surface, and a concave free-form mirror. Thereby, it may be possible to decrease a diameter of a lens close to a concave mirror and a size of a concave mirror and obtain a sufficient optical property while a back focus is ensured. Furthermore, a projection optical system according to an embodiment of the present invention is such that, at a time of focusing, a positive first lens group is fixed and a positive second lens group and a negative third lens group are moved by different amounts of movement in an identical direction along an optical axis, while a fourth lens group with an aspheric surface or a free-form surface is moved accessorily and a concave mirror is fixed. Thereby, it may be possible to display a better image that is focused on an entire screen (or has a smaller curvature of field) and has a smaller distortion.

APPENDIX

An Illustrative Embodiment(s) of a Projection Optical System

At least one illustrative embodiment of the present invention may relate to a projection optical system applicable to an image projection apparatus for enlarging, and projecting onto a screen, an image.

An object of at least one illustrative embodiment of the present invention may be to provide a projection optical system wherein it is possible to decrease a lens diameter of a lens close to a concave mirror or a size of a concave mirror to decrease a total size of a projection optical system.

At least one illustrative embodiment of the present invention may be a projection optical system for enlarging, and projecting onto a surface subjected to projection, an image displayed on an image display element, that is principally characterized in that the projection optical system includes a refractive optical system composed of a plurality of lens groups and a mirror optical system having a concave mirror, wherein the refractive optical system and the mirror optical system are such that a first lens group having a positive refractive power, a second lens group having a positive refractive power, a third lens group having a negative refractive power, a fourth lens group having one or more lenses having an aspheric surface or a free-form surface, and a concave mirror are arranged in order from the image display element to the surface subjected to projection, and is an optical system that is non-telecentric with respect to the image display element.

Illustrative embodiment (1) is a projection optical system for enlarging, and projecting onto a surface subjected to projection, an image displayed on an image display element, wherein the projection optical system is characterized in that the projection optical system includes a refractive optical system composed of a plurality of lens groups and a mirror optical system having a concave mirror, wherein the refractive optical system and the mirror optical system are such that a first lens group having a positive refractive power, a second lens group having a positive refractive power, a third lens group having a negative refractive power, a fourth lens group including one or more lenses having an aspheric surface or a free-form surface, and a concave mirror are arranged in order from the image display element to the surface subjected to projection, and is an optical system that is non-telecentric with respect to the image display element.

Illustrative embodiment (2) is the projection optical system as described in illustrative embodiment (1), wherein a lens surface of a lens closest to the second lens group among lenses that compose the first lens group is a convex surface facing the second lens group.

Illustrative embodiment (3) is the projection optical system as described in illustrative embodiment (1) or (2), having an aperture stop for limiting a light beam captured from the image display element, wherein the aperture stop is arranged between the image display element and the first lens group or between lenses that compose the first lens group.

Illustrative embodiment (4) is the projection optical system as described in any of illustrative embodiments (1) to (3), wherein when focusing is conducted for the surface subjected to projection, the first lens group is fixed and the second lens group and the third lens group conduct movement thereof by mutually different amounts and directions of the movement are identical directions in directions of optical axes of the second lens group and the third lens group.

Illustrative embodiment (5) is the projection optical system as described in any of illustrative embodiments (1) to (4), wherein when focusing is conducted for the surface subjected to projection, a lens group having the aspheric surface or the free-form surface is moved.

Illustrative embodiment (6) is the projection optical system as described in any of illustrative embodiments (1) to (5), wherein when a plane folding mirror is arranged between the refractive optical system and the concave mirror and an angle formed between a principal ray of a light beam directed from a center of the image display element in a direction of a long side thereof to the plane folding mirror and an axis line perpendicular to the image display element is less than or equal to 30°.

Illustrative embodiment (7) is a projection optical system for enlarging, and projecting onto a surface subjected to projection, an image displayed on an image display element, wherein the projection optical system is characterized in that the projection optical system has an aperture stop for limiting a light beam captured into the projection optical system, a refractive optical system composed of a plurality of lens groups, and a mirror optical system having a concave mirror, wherein the refractive optical system and the mirror optical system are such that a first lens group having a positive refractive power, a second lens group having a positive refractive power, a third lens group having a negative refractive power, a fourth lens group including one or more lenses having an aspheric surface or a free-form surface, and a concave mirror are arranged in order from the image display element to the surface subjected to projection and the aperture stop is arranged at a side nearer the image display element than a focus of parallel rays of incident light that are light rays perpendicular to the image display element and parallel to an optical axis of the first lens group, from the image display element to the concave mirror, and is an optical system that is non-telecentric with respect to the image display element.

Illustrative embodiment (8) is the projection optical system as described in any of illustrative embodiments (1) to (7), wherein the image display element is a reflection-type image display element.

According to at least one illustrative embodiment of the present invention, it may be possible to decrease a lens diameter of a lens close to a concave mirror or a size of a concave mirror to decrease a total size of a projection optical system.

According to at least one illustrative embodiment of the present invention, it may be possible to provide a compact projection optical system while it is possible to conduct projection at a highly close range.

Although the illustrative embodiment(s) and specific example(s) of the present invention have been described with reference to the accompanying drawing(s), the present invention is not limited to any of the illustrative embodiment(s) and specific example(s), and the illustrative embodiment(s) and specific example(s) may be altered, modified, or combined without departing from the scope of the present invention.

The present application is based on and claims the benefit of priority to Japanese Patent Application No. 2012-258052 filed on Nov. 26, 2012, the entire content of which is herein incorporated by reference.

What is claimed is:
1. A projection optical system, comprising:
a first lens group configured to include at least one lens and have a positive refractive power;
a second lens group configured to include at least one lens and have a positive refractive power;
a third lens group configured to include at least one lens and have a negative refractive power;
a fourth lens group configured to include at least one lens configured to have an aspheric surface or a free-form surface; and
a concave mirror;
wherein the first lens group, the second lens group, the third lens group, the fourth lens group, and the concave mirror are arranged in order and the projection optical system is a non-telecentric optical system.

2. The projection optical system as claimed in claim 1, wherein a lens included in the first lens group and being closest to the second lens group has a convex surface facing the second lens group.

3. The projection optical system as claimed in claim 1, further comprising an aperture stop, wherein the aperture stop is arranged at an opposite side of the second lens group with respect the first lens group or in the first lens group.

4. The projection optical system as claimed in claim 1, further comprising an aperture stop, wherein the aperture stop is arranged at a side of the first lens group with respect to a focus of light rays parallel to an optical axis of the first lens group.

5. The projection optical system as claimed in claim 1, wherein focusing is conducted by fixing the first lens group and moving the second lens group and the third lens group by mutually different amounts in an identical direction along a direction of an optical axis of the second lens group or the third lens group.

6. The projection optical system as claimed in claim 1, wherein focusing is conducted by moving the fourth lens group.

7. The projection optical system as claimed in claim 1, further comprising a plane folding mirror, wherein the plane folding is being arranged between the fourth lens group and the concave mirror and an angle of a principal ray passing through a center of an object plane with respect to a normal line of the object plane is 30° or less.

8. An image projection apparatus, comprising:
   an image display element configured to display an image; and
   the projection optical system as claimed in claim 1.

9. The image projection apparatus as claimed in claim 8, wherein the image display element is a reflection-type image display element.

* * * * *